(12) United States Patent
Mukawa et al.

(10) Patent No.: US 8,453,930 B2
(45) Date of Patent: Jun. 4, 2013

(54) READING DEVICE

(75) Inventors: Tatsuya Mukawa, Kanagawa (JP);
Kazuki Saitou, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/062,774

(22) PCT Filed: Mar. 1, 2010

(86) PCT No.: PCT/JP2010/001363
§ 371 (c)(1),
(2), (4) Date: Apr. 14, 2011

(87) PCT Pub. No.: WO2010/098144
PCT Pub. Date: Sep. 2, 2010

(65) Prior Publication Data
US 2011/0297819 A1    Dec. 8, 2011

(30) Foreign Application Priority Data

Feb. 27, 2009   (JP) .................................. 2009-044995
Apr. 13, 2009   (JP) .................................. 2009-097486

(51) Int. Cl.
*G06K 7/10* (2006.01)
(52) U.S. Cl.
USPC ........................................................ 235/454
(58) Field of Classification Search
USPC .................. 235/439, 454, 459, 474; 358/474
See application file for complete search history.

(56) References Cited

U.S. PATENT DOCUMENTS 7,843,611 B2 * 11/2010 Albahri ......................... 358/474
8,274,712 B2 *  9/2012 Sheng et al. ................... 358/474
(Continued)

FOREIGN PATENT DOCUMENTS

JP          63-52347 U     4/1988
JP          06-247084 A    9/1994
(Continued)

OTHER PUBLICATIONS

European Search Report for Application No. 10746027.1-2202/2323368 PCT/JP2010001363 dated May 14, 2012.

(Continued)

*Primary Examiner* — Seung Lee
(74) *Attorney, Agent, or Firm* — Pearne & Gordon LLP

(57) ABSTRACT

A reader device (1) includes a mounting surface (5) on which a passport (7) with a page to be read (9) is placed, a light source (21, 31) for illuminating the page to be read (9), and a camera (13) for picking up an image of the page to be read (9). The light source (21, 31) is arranged outside a front area of the page to be read. The page to be read (9) contains a near-edge code positioned close to an edge of the page to be read (9). The light source (21, 31) includes an infrared LED array (23) and a white LED array (33). An infrared LED (25e) and a white LED (35f) included in the infrared LED array (23) and the white LED array (33), respectively, and located at a near-edge code position corresponding to the near-edge code are arranged closer to the page to be read than the other infrared LEDs (25a to 25d) and white LEDs (35a to 35e) in a direction perpendicular to the mounting surface (5). Thus, a reader device is provided which allows a good image to be obtained even if a relevant page of an object to be read is deformed.

14 Claims, 13 Drawing Sheets

U.S. PATENT DOCUMENTS

| | | |
|---|---|---|
| 2004/0169894 A1* | 9/2004 | Schroath et al. .............. 358/474 |
| 2005/0007776 A1 | 1/2005 | Monk et al. |
| 2006/0113386 A1 | 6/2006 | Olmstead |

FOREIGN PATENT DOCUMENTS

| | | |
|---|---|---|
| JP | 08-223377 A | 8/1996 |
| JP | 2006-279227 A | 10/2006 |
| JP | 2008-148211 A | 6/2008 |
| JP | 2008-304860 A | 12/2008 |
| WO | 01/28226 A1 | 4/2001 |

OTHER PUBLICATIONS

International Search Report for PCT/JP2010/001363 dated Apr. 13, 2010.

* cited by examiner

READING DEVICE

TECHNICAL FIELD

The present invention relates to a reader device for picking up an image of an object to be read and carry out reading processing on the image, and in particular, to arrangement of light sources for image pickup.

BACKGROUND ART

Reader devices are conventionally known which read codes such as characters from various objects to be read. The object to be read is, for example, a document with a plurality of sheets bound up. The document is, for example, a passport.

The conventional reader device is configured to illuminate a surface to be read of an object to be read with infrared light to pick up an image of a code on the surface to be read, thus acquiring an infrared light image. The infrared light image is subjected to reading processing such as OCR (Optical Character Recognize) to allow the code to be recognized. The use of infrared light as illumination light allows prints in black ink, which is likely to absorb infrared light, to be emphasized to make a background image relatively unclear. This makes the code in a sharper contrast with the remaining part of the image. Furthermore, a fraud can be detected by comparison with an image picked up by visible light and showing characters or graphics drawn with ink that absorbs infrared light and reflects visible light.

Furthermore, when an image of an object to be read is displayed on a monitor or the like, for example, to allow an operator to visually check the image, the object to be read is illuminated with visible light instead of infrared light to acquire a visible light image. Alternatively, like infrared light images, the visible light image may be subjected to OCR to allow the code to be recognized.

For example, Patent Literature 1 discloses a reader device configured to irradiate an object to be read with both infrared light and visible light. This conventional device uses visible light to generate a hologram image, while using infrared light to read a code printed in a layer under the hologram.

Furthermore, the reader device needs to avoid image pickup under a specular reflection condition. The specular reflection condition is such that the direction of image pickup coincides with the incident angle of illumination light, that is, the direction of specular reflection. When an image of a surface to be read is picked up under the specular reflection, reflected light is excessively intense and what is called "washed-out highlight" occurs. This may prevent the good image from being obtained. The "washed-out highlight" refers to white-out that occurs in a part of an image as a result of the saturated dynamic range of an imaging device. In this phenomenon, the visible light image whites out to prevent a subject from showing up in the image or to make the subject in the image difficult to see. In the conventional art, in order to avoid the specular reflection condition, the surface to be read is illuminated from the side and picked up from the front. This enables the reflection angle of illumination light (=incident angle) to be increased to avoid the specular reflection condition (see, for example, Patent Literature 2).

However, the conventional reader device poses the following problems in connection with deformation of the object to be read.

An object to be read such as a passport may wet with an owner's sweat, for example, when carried in the owner's pocket. The wetting and the subsequent drying or the like subjects the edge of the object to be read to wave-like deformation (corrugation). When such wave-like deformation occurs, imaging of the edge may be carried out under the specular reflection condition, resulting in washed-out highlight. If a code such as characters is present at the edge, the code may fail to appear clearly in the image. Thus, desirably, illumination is properly provided so as to suitably prevent the wave-like deformation of the edge to allow an image of the code at the edge to be picked up.

For example, passports are covered with a laminate or the like. Hence, washed-out highlight is likely to occur in an image of the passport under the specular reflection condition. Furthermore, in many of the passports, a code is printed so as to end in a corner of the corresponding page. The above-described wave-like deformation of the page is likely to be significant in the corner of the page. Thus, when an image of a passport subjected to wave-like deformation is picked up under illumination with visible light, a part of the code located in the corner may be difficult to see as a result of washed-out highlight. In particular, one or two characters in the corner are difficult to see. Thus, desirably, illumination is properly provided so as to prevent possible washed-out highlight in the part of the code located at the edge.

To avoid the above-described problem, the device may include a cover for holding the object to be read. However, when the object to be read is a passport or the like, a reading operation needs to be performed quickly. Thus, desirably, illumination can be properly provided without the use of a cover or the like, even if the object to be read slightly floats.

Furthermore, for miniaturization of the device, an optical path through which images are read may be bent using a mirror, to reduce the volume of the whole device. In this case, the mirror is arranged between the surface to be read and a camera. Reflected light from the surface to be read is bent by the mirror before reaching the camera. However, when the mirror is provided, illumination light is also reflected by the mirror and impinges on the surface to be read of the object to be read. As a result, illumination unevenness may occur to degrade the reading ability or make a display image difficult to see.

CITATION LIST

Patent Literature

Patent Literature 1: Japanese Patent Laid-Open No. 6-247084
Patent Literature 2: Japanese Patent Laid-Open No. 2008-304860

SUMMARY OF INVENTION

Technical Problem

The present invention has been developed against the above-described background. An object of the present invention is to provide a reader device capable of providing the good image even if a relevant page of the object to be read is deformed. Another object of the present invention is to provide a reader device capable of reducing illumination unevenness resulting from provision of a mirror.

Solution to Problem

An aspect of the present invention is a reader device comprising an object placing unit on which an object to be read with a surface to be read is placed, a light source for illuminating the surface to be read placed on the object placing unit, and an imaging unit for picking up an image of the surface to be read illuminated by the light source, wherein the light source is arranged outside a front area of the surface to be read, and the surface to be read includes a near-edge code positioned close to an edge, and wherein the light source includes a light emitting element array comprising a plurality of light emitting elements, and a light emitting element included in the light emitting element array and located at a near-edge code position corresponding to the near-edge code is arranged closer to the surface to be read than the other light emitting elements in the light emitting element array in a direction perpendicular to the object placing unit.

As described below, the present invention includes other aspects. Thus, the disclosure of the present invention is intended to provide some of the aspects of the present invention and not to limit the scope of the present invention described and claimed herein.

DESCRIPTION OF EMBODIMENTS

Figure 1:
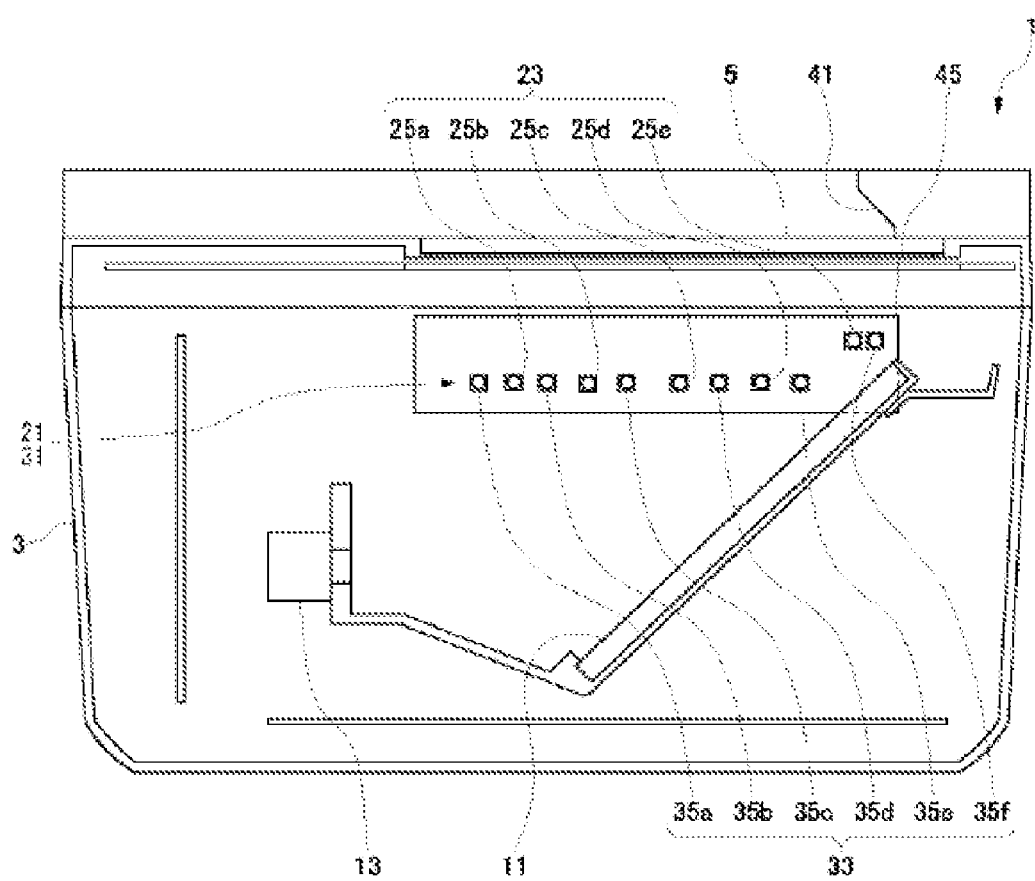
FIG. 1 is a cross-unital view of a reader device according to a first embodiment of the present invention.

The present invention will be described below in detail. However, the detailed description below and the accompanying drawings are not intended to limit the present invention. Instead, the scope of the present invention is limited by the accompanying claims.

First Embodiment

The reader device according to the present invention includes an object placing unit on which an object to be read with a surface to be read is placed, a light source for illuminating the surface to be read placed on the object placing unit, and an imaging unit for picking up an image of the surface to be read illuminated by the light source. The light source is arranged outside a front area of the surface to be read, and the surface to be read includes a near-edge code positioned close to an edge. The light source includes a light emitting element array comprising a plurality of light emitting elements, and a light emitting element included in the light emitting element array and located at a near-edge code position corresponding to the near-edge code is arranged closer to the surface to be read than the other light emitting elements in the light emitting element array in a direction perpendicular to the object placing unit.

In this configuration, the light source is arranged locally closer to the object to be read in a place where the code is present close to the surface to be read. Thus, even if the edge of the surface to be read is subjected to wave-like deformation as a result of wetting of the object to be read, the part of the code located close to the edge is prevented from being imaged under a specular reflection condition. Hence, illumination can be properly provided so as to prevent the part of the code located at the edge from being difficult to see as a result of washed-out highlight.

Furthermore, the reader device according to the present invention may further include a mirror for redirecting an optical path between the surface to be read and the imaging unit. The light emitting element array may be positioned such that main light from the light emitting elements is prevented from traveling to the surface to be read after reflection by the mirror.

This configuration can eliminate illumination unevenness resulting from reflection by the mirror to obtain a good image. Thus, the configuration can improve a character recognition rate and the accuracy with which the image is checked. The configuration also facilitates visual recognition of the image acquired.

Furthermore, in the reader device according to the present invention, the near-edge code is provided at an end of the edge of the surface to be read. The light emitting element located at the near-edge code position is positioned at an end of the light emitting element array.

In this configuration, the code is positioned at the end of the edge of the surface to be read, that is, in a corner of the surface to be read. The corner is more seriously affected by deformation. However, in the present invention, the light source is locally located closer to the surface to be read, thus properly preventing possible washed-out highlight in the corner.

Furthermore, the reader device according to the present invention may be configured as follows. The reader device includes a mirror for redirecting an optical path between the surface to be read and the imaging unit. The mirror is inclined to the surface to be read. The light emitting element located at the near-edge code position is positioned at one of opposite ends of the light emitting element array which is closer to the mirror.

This configuration enables a reduction in illumination unevenness resulting from provision of the mirror. The configuration focuses on the illumination unevenness occurring at the near-edge code and can reduce the illumination unevenness for the following two reasons. The mirror is inclined and the near-edge code is thus located close to the mirror. According to the present invention, the light emitting element located close to the near-edge code may be arranged away from the mirror (assuming that all the light emitting elements are arranged in a line, the light emitting element located close to the near-edge code is arranged very close to the mirror, but the position of this light emitting element is further from the mirror than this assumed position). This enables a reduction in the illumination unevenness occurring in the near-edge code portion as a result of the adverse effect of the mirror. Furthermore, the illumination unevenness associated with the mirror is such that the surface to be read appears brighter at a position further from the light emitting element and relatively dark at a position closer to the light emitting element. In contrast, in the present invention, the light emitting element is located close to the surface to be read. Hence, a place close to the light emitting element can be made brighter, enabling a reduction in illumination unevenness. Thus, the above-described two effects work synergistically to reduce the illumination unevenness occurring at the near-edge code. Therefore, the present configuration suitably exerts effects such as improvement of the reading ability.

Furthermore, in the reader device according to the present invention, the light source may include a first light source for irradiating the surface to be read with first illumination light in a first wavelength band and a first radiation angle in order to acquire a first image used for reading processing, and a second light source for irradiating the surface to be read with second illumination light in a second wavelength band wider than the first wavelength band and a second radiation angle wider than the first radiation angle in order to acquire a second image used for an application including display.

This configuration serves to provide a reader device that uses the plural types of light sources to utilize the characteristics of the light sources to allow the surface to be read to be suitably read. The radiation angle corresponds to a range within which the illumination light exhibits a brightness of a predetermined level or higher, for example, the range within which when a frontward brightness is set to be a reference value, the illumination light exhibits a brightness accounting for at least a predetermined rate of the reference value.

Furthermore, in the reader device according to the present invention, the first light source is an infrared light source, and the second light source is a visible light source. In this configuration, the infrared light source is used to obtain an image for reading processing. The visible light source is used to obtain an image for display. The visible light source provides a wider wavelength band and a wider radiation angle than the infrared light source. Even with such plural types of light sources, the advantages of the present invention are suitably obtained.

Furthermore, in the reader device according to the present invention, the object to be read is a passport. In this configuration, even if the object to be read is a passport covered with a laminate or the like, illumination can be properly achieved. The good image is obtained even if the object to be read floats.

In the present invention, the light source is locally arranged closer to the near-edge code as described above. Thus, the good image is obtained even if a relevant page of the object to be read is deformed. Additionally, in the present invention, the light source is properly arranged as described above to enable a reduction in the illumination unevenness resulting from the provision of the mirror.

A reader device according to an embodiment of the present invention will be described with reference to the drawings.

In the present embodiment, the object to be read is a document or a card. In particular, an example of the document is a passport, and an example of the card is a boarding card for an airplane. Furthermore, the present embodiment uses two light sources. A first light source is an infrared light source. A second light source is a visible light source, particularly a white light source.

Figure 2:
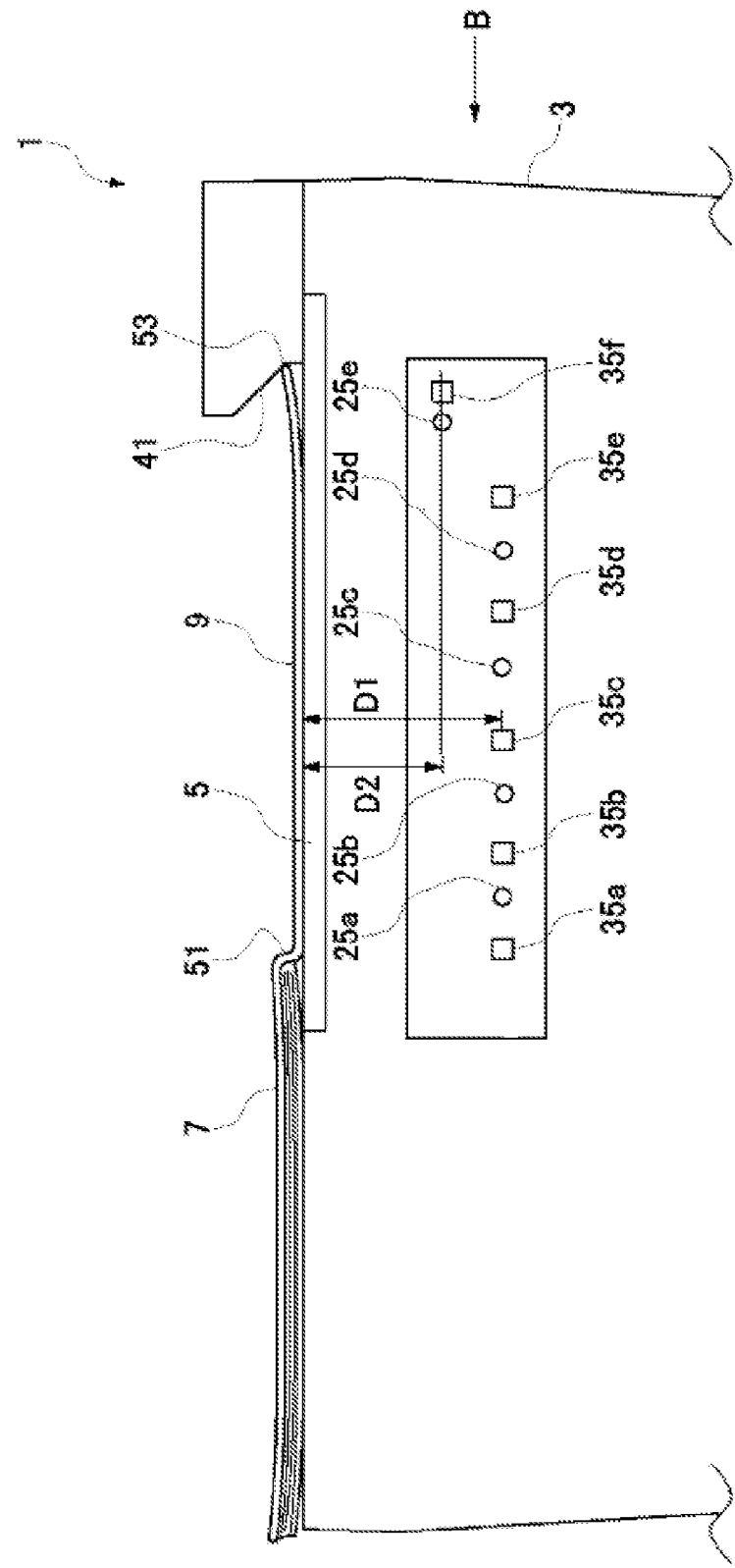
FIG. 2 is a cross-unital view of the reader device according to the first embodiment of the present invention, showing the arrangement of light sources.
Figure 3:
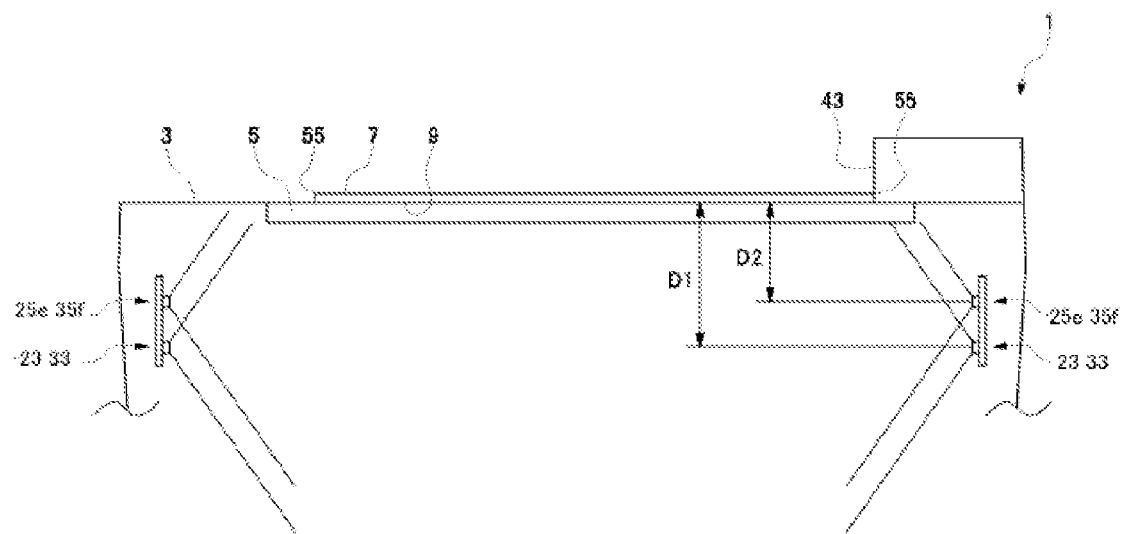
FIG. 3 is a cross-unital view of the reader device according to the first embodiment of the present invention, showing the arrangement of the light sources.
Figure 4:
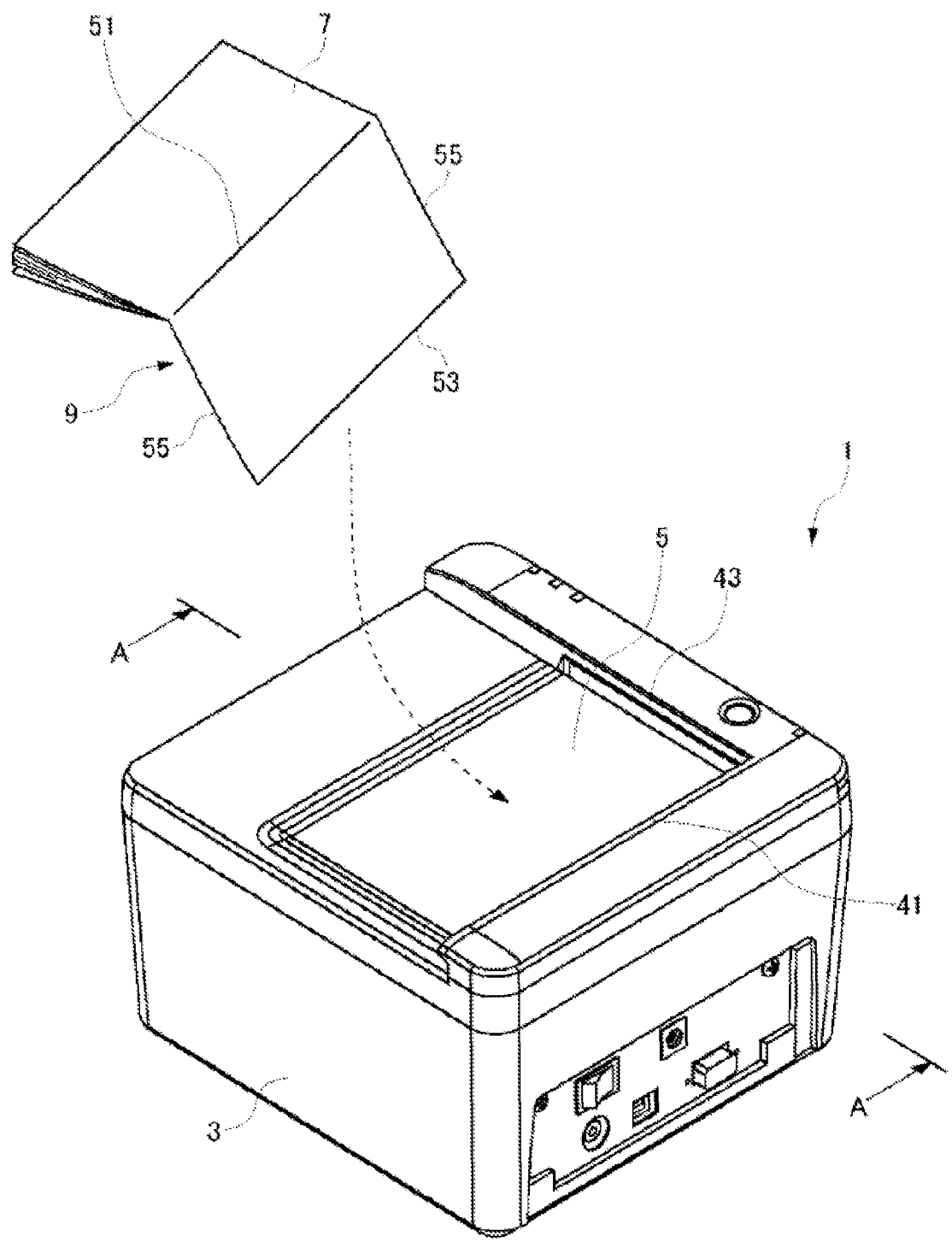
FIG. 4 is a perspective view of the reader device according to the first embodiment of the present invention.
Figure 5:
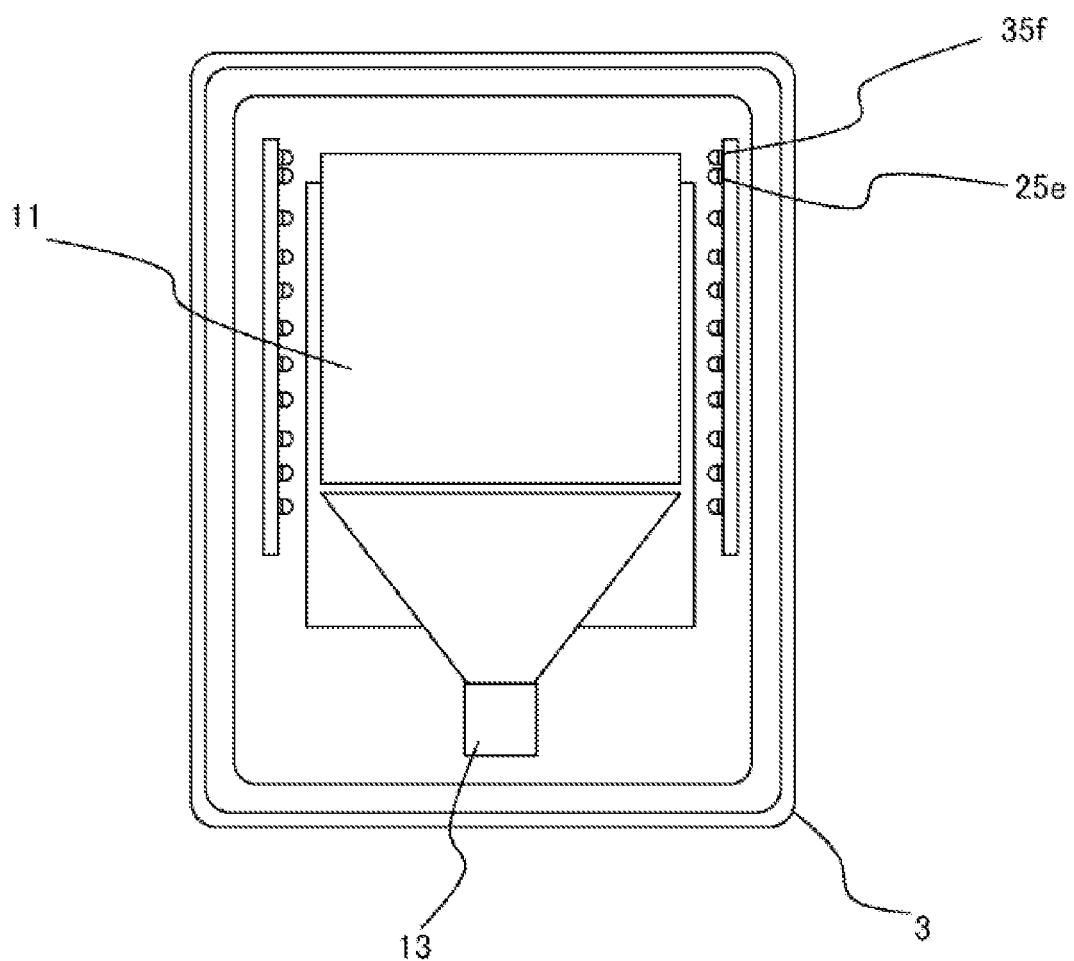
FIG. 5 is a diagram showing the interior of the reader device with an upper case of the device removed.

The reading device according to the embodiment of the present invention is shown in FIG. 1 to FIG. 4. FIG. 1 to FIG. 3 are cross-unital views, and FIG. 4 is a perspective view. Furthermore, in FIG. 5, a top cover of the device has been removed, and light sources 21 and 31, a mirror 11, and a camera 13 are shown. FIG. 3 is a cross-unital view taken orthogonally to a cross unit AA shown in FIG. 2. FIG. 3 shows the difference in height between both an infrared LED 25e and a visible light LED 35f shown in FIG. 1 and the other LEDs in an LED array. The visible light LED is also referred to as the white LED.

First, as shown in FIG. 4, a reader device 1 includes a substantially cubic housing 3 with a mounting surface 5 provided on the top thereof. The mounting surface 5 is a transparent glass plate. The mounting surface 5 is where a passport 7 that is an object to be read is placed for reading and corresponds to an object placing unit according to the present invention. Furthermore, the housing 3 includes stop units 41 and 43 that are perpendicular to each other. The stop units 41 and 43 include stop walls. Two perpendicular sides of the passport 7 are brought into abutting contact with the stop units 41 and 43 to position the passport 7 on the mounting surface 5.

Figure 6:
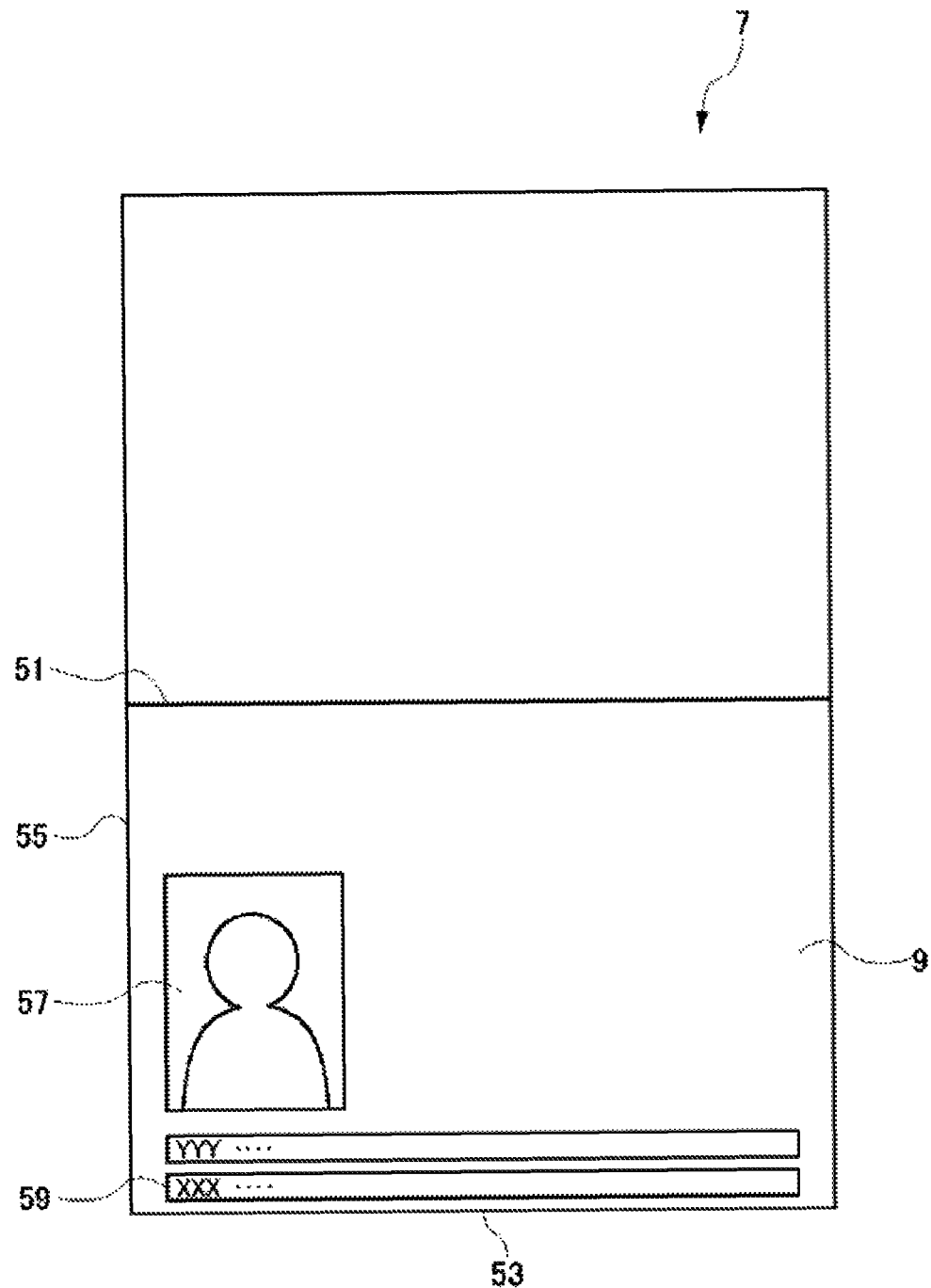
FIG. 6 is a diagram showing a page to be read of a passport that is an object to be read.

FIG. 6 schematically shows the passport 7. The passport 7 is a kind of document as described above and is formed of a plurality of sheets bound up at the center thereof. The passport 7 includes a page to be read 9 with a long edge 53 parallel to a binding edge 51 and a short edge 55 perpendicular to the binding edge 51. The long edge 53 and the short edge 55 correspond to a long side and a short side, respectively, of the page to be read 9, which is rectangular. The page to be read 9 contains a photograph 57 and a code 59. The code 59 is a string of characters or the like to be read by the reader device 1. In the passport 7, the code 59 is provided along the long edge 53. The passport 7 is placed on the mounting surface 5 so that the page to be read 9 faces downward.

FIG. 1 is a cross-unital view showing the reader device 1 cut along line A-A in FIG. 4. FIG. 2 is a diagram showing the arrangement of the light sources as viewed from the same direction as that in FIG. 1. FIG. 3 is a diagram showing the arrangement of the light sources as viewed from the direction of an arrow B in FIG. 2.

As shown in FIG. 1, a mirror 11 is provided under the mounting surface 5. The camera 13 is provided beside the mirror 11. The camera 13 corresponds to an imaging unit according to the present invention. The camera 13 utilizes reflection by the mirror 11 to pick up an image of the passport 7 from below. The camera 13 may pick up both an infrared light image and a visible light image. Alternatively, the infrared light image and the visible light image may be picked up by separate cameras. In this case, the imaging unit is formed of a plurality of cameras.

Furthermore, as shown in FIG. 1 to FIG. 3, the reader device 1 includes an infrared light source 21 and a white light source 31 both provided in a housing 3. The infrared light source 21 is formed of an infrared LED array 23 including a plurality of infrared LEDs 25a to 25e. Additionally, the white light source 31 is formed of a white LED array 33 including a plurality of white LEDs 35a to 35f. The infrared LED array 23 and the white LED array 33 are parallel to the mounting surface 5 (page to be read 9). The infrared LEDs 25a to 25e and the white LEDs 35a to 35f are attached to a circuit board 45. In addition, the infrared LED 25e and the white LED 35f are arranged close to the mounting surface 5.

As shown in FIG. 2, the infrared light source 21 (infrared LED array 23) and the white light source 31 (white LED array 33) are arranged outside a front area of the page to be read 9 and outside both short edges 55.

Furthermore, as shown in FIG. 1 to FIG. 3, the infrared light source 21 (infrared LED array 23) and the white light source 31 (white LED array 33) are arranged away from the page to be read 9 in the perpendicular direction. Here, the perpendicular direction is perpendicular to the page to be read 9 placed on the mounting surface 5, that is, perpendicular to the mounting surface 5. In the present embodiment, the infrared light source 21 and the white light source 31 are arranged at a first distance D1 from the page to be read 9 in the perpendicular direction. However, the white LED 35f and the infrared LED 25e located close to the corner of the object to be read are arranged at a second distance D2 at which the white LED 35f and the infrared LED 25e lie closer to the mounting surface than the other LEDs. One of the white LED 35f and the infrared LED 25e may be exclusively arranged at the position corresponding to the second distance D2 depending on the object to be read, without departing from the scope of the present invention. Additionally, in the example illustrated in FIG. 1 and other figures, the white LEDs and the infrared LEDs are arranged at the first distance D1 in a line. However, either the white LEDs or the infrared LEDs may be arranged at a distance longer than the first distance D1. Alternatively, some of the LEDs may be arranged at a distance longer than the first distance D1 regardless of whether the white LEDs or the infrared LEDs. Thus, it is also preferable that the light emitting element arrays be arranged so as to be slightly displaced from each other in the perpendicular direction, allowing the object to be read to be evenly illuminated with light.

As described above, the white LED 35f, included in the white LED array 33 and located at an end of the array 33 which is furthest from the binding edge 51, is exceptionally arranged closer to the page to be read 9 than the other white LEDs 35a to 35e in the perpendicular direction. The white LED 35f, located at the furthest end, is arranged adjacent to the infrared LED 25e, located at the furthest end of the infrared LED array 23. As described above, if the object to be read is read using infrared light, the infrared LED 25e may be exclusively arranged closer to the page to be read 9. If the visible light image may be focused on, the white LED 35f may be exclusively arranged closer to the page to be read 9.

Now, the operation of the reader device 1 according to the present embodiment will be described. First, a user mounts the passport 7 on the mounting surface 5 so that the page to be read 9 faces downward. The long edge 53 and short edge 55 of the passport 7 are brought into abutting contact with the stop units 41 and 43 to position the passport 7. Then, an image of the page to be read 9 is picked up in response to the user's operation.

When the device carries out reading processing, the infrared light source 21 illuminates the page to be read 9 with infrared light, and the camera 13 generates an infrared light image. The infrared light image is used for the reading process and corresponds to the first image according to the present invention. Then, a reading processing unit (not shown in the drawings) processes the infrared light image to recognize the code such as characters. In the infrared light image, a background image is prevented from showing up clearly, whereas the code such as characters to be recognized is in a sharp contrast with the background image. Thus, the reading process can be accurately carried out. The reading processing unit may be formed of a computer. Alternatively, the reading processing unit may be provided outside the reader device 1.

Furthermore, when an image for display is to be acquired, the white light source 31 irradiates the page to be read 9 with white light, and the camera 13 generates a visible light image. The visible light image is output to a monitor (not shown in the drawings), on which the visible light image is displayed. The visible light image corresponds to the second image according to the present embodiment.

Now, the arrangement of the infrared light source 21 and the white light source 31 according to the present embodiment will be described in further detail. The positions and directions of the infrared light source 21 and the white light source 31 are basically set so as to avoid the specular reflection condition. The specular reflection condition refers to the coincidence of the direction of image pickup with the direction of specular reflection of illumination light. When an image of the page to be read 9 is picked up under the specular reflection condition, reflected light obtained is excessively intense, leading to what is called washed-out highlight. This prevents the good image from being obtained. Also for the infrared light source 21, the specular reflection condition needs to be avoided in order to ensure the reading ability. In the present embodiment, the infrared light source 21 and the white light source 31 are arranged outside the front area of the page to be read 9 and illuminate the page to be read 9 from the side. This allows an incident angle to be set wider and serves to avoid the specular reflection condition and thus washed-out highlight.

In the present embodiment, the arrangement of the light sources is set taking into account not only the above-described factors but also possible deformation of the passport 7 and the adverse effect of the mirror 11. The factors concerning the deformation as well as the arrangement of the light sources will be described below.

"Setting the Arrangement of the Light Sources with Deformation of the Object to be Read taken into Account"

First, the arrangement of the light sources with deformation of the passport 7, which is the object to be read, taken into account will be described. Here, focus is placed on the arrangement of the white LED 35f, located at the end of the white light source 31, and the infrared LED 25e, located at the end of the infrared light source 21. Mainly the arrangement of the white LED 35f will be described below. The arrangement of the infrared LED 25e is set similarly to that of the white LED 35f for generally similar reasons.

Figure 7:
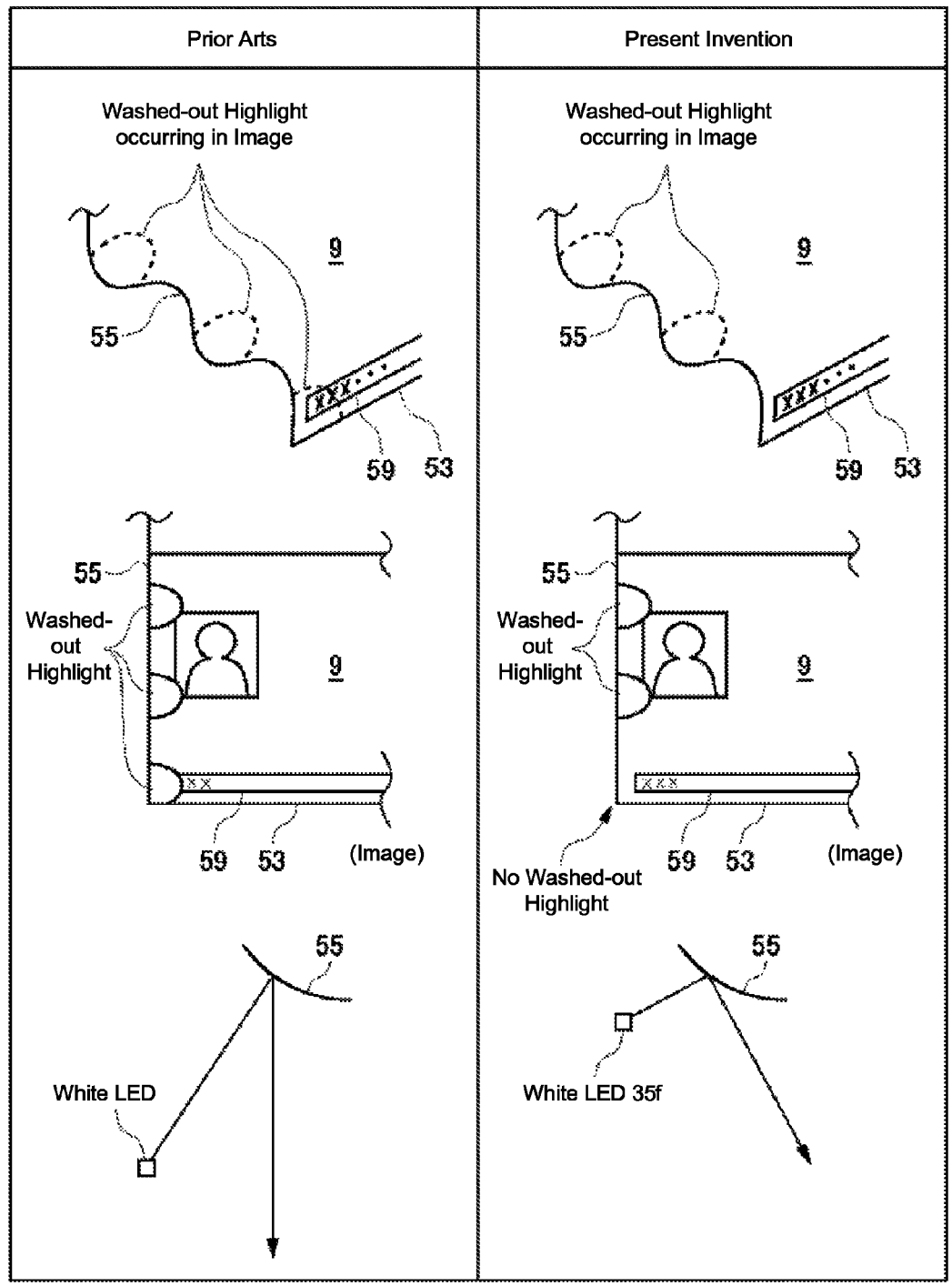
FIG. 7 is a diagram illustrating the principle of the present invention for prevention of possible washed-out highlight at the position of a code when a passport is subjected to wave-like deformation.

As shown in FIG. 7, the arrangement of the white LED 35f relates to the position of the code 59 on the page to be read 9. The code 59 is provided close to and along the long edge 53 of the page to be read 9. The end of the code 59 reaches the vicinity of the short edge 55 of the page to be read 9 and is positioned in the corner of the page to be read 9.

The white LED 35f is positioned at the further end of the white LED array 33. The position of the white LED 35f corresponds to the code 59 in the direction of the array. The white LED 35f is arranged higher than the other white LEDs 35a to 35e in the white LED array 33, that is, closer to the page to be read 9 in the perpendicular direction.

The passport 7 may be held in an owner's pocket for a long time and wet with the owner's sweat. The wetting and the subsequent drying or the like or putting and taking the passport 7 into and out of the pocket subjects the edges of the passport 7 to wave-like deformation (corrugation), with the end of each edge subjected to curled deformation. In the pocket, the short edge 55 is positioned at the bottom portion of the pocket. Thus, the short edge 55 is likely to undergo such deformation.

When the wave-like deformation occurs, the angle between the page to be read 9 and the white light source 31 increases and decreases periodically along the short edge 55. In a place where the angle between the page to be read 9 and the white light source 31 is wider, the incident angle (=output angle) is narrower, thus allowing the specular reflection condition to be locally established. Consequently, when the wave-like deformation occurs, the specular reflection condition is periodically established along the short edge 55. As a result, as shown in the left half of FIG. 7, a plurality of small washed-out areas are created at intervals along the short edge 55. Depending on the shape of the corrugation, any of the washed-out areas overlaps the code 59, the end of which lies in the washed-out area, as shown in FIG. 7. Thus, in an image generated using the white light source 31, the end of the code 59 is difficult to see. In particular, about one or two characters located at the end of the code 59 are difficult to see.

The code 59 is a target for automatic reading using the infrared light source 21. However, even in a visible light image picked up using the white light source 31, the entire code 59 needs to be displayed, for example, to allow the result of reading to be checked. Thus, such a washed-out highlight phenomenon as described above needs to be prevented.

To accomplish this object, the present embodiment is configured such that the white LED 35*f*, positioned so as to correspond to the code 59, is locally arranged close to the page to be read 9. Thus, the incident angle (=output angle) of white light is wider at the position of the code 59 than in the other places. Hence, even with a change in the angle of the corner of the page to be read 9 resulting from deformation, the incident angle is prevented from decreasing excessively. The specular reflection condition can thus be avoided. This serves to prevent possible washed-out highlight at the position corresponding to the code 59 as shown in the right half of FIG. 7.

When the white LED 35*f* is arranged close to the page to be read 9, the irradiation range of the white LED 35*f* is narrowed. This may cause illuminance unevenness. However, in the present embodiment, only the white LED 35*f* is locally arranged at the different position. The other LEDs illuminate the entire page to be read 9 with light over a wide radiation angle. Hence, possible illuminance unevenness is not significant enough to affect the check of the image.

Furthermore, as shown in FIG. 7, washed-out areas remain in a place where the code 59 is not provided. However, in the areas other than the one in which the code 59 is written, information with a high level of importance (for example, a photograph of the owner's face) is located close to the center of the page so as to avoid the contamination or deformation of the page. Thus, the present embodiment acquires a good image of the area of the code 59, which is likely to be deformed, while somewhat permitting the occurrence of washed-out highlight in areas in which information with a high level of importance is unlikely to be written.

Conventional copiers and the like include a cover for holding an object to be read. Such a cover may be included in the reader device in order to prevent the adverse effect of deformation of the passport 7. However, the reading of the passport 7 is carried out, for example, for an immigration check at an airport and thus needs to be quickly finished. Thus, if each passport 7 is set and held using the cover, the operation requires a long time. In contrast, as shown in FIG. 1, the reader device 1 according to the present embodiment need not include a presser cover and allows the passport 7 to be set on the mounting surface 5 in a short time.

The arrangement of the white LED 35*f* has been described. As described above, the infrared LED 25*e* is arranged closer to the page to be read 9 than the other infrared LEDs 25*a* to 25*d* for similar reasons. Thus, the specular reflection condition involved in the deformation of the passport 7 can be avoided. Furthermore, the adverse effect of the illumination unevenness is sufficiently insignificant.

"Determination of Arrangement of the Light Sources with Reflection by the Mirror taken into Account"

Now, setting of the arrangement of the light sources with reflection by the mirror 11 taken into account will be described. Illumination light is not only emitted directly to the page to be read 9 but also reflected by the mirror 11 to impinge on the page to be read 9. The illumination light from the mirror 11 overlaps the direct illumination light. Such illumination light from the mirror 11 may cause illumination unevenness.

When such illumination unevenness occurs, the page to be read 9 becomes partly brighter under the effect of the illumination light from the mirror 11. If the mirror 11 is inclined as shown in FIG. 1, the distance between the mirror 11 and the light emitting elements (LEDs) varies gradually. A reduction in the distance between the mirror 11 and the light emitting elements increases the range on the page to be read 9 covered by the illumination light from the mirror 11. Thus, as shown in FIG. 1, when the mirror 11 is inclined, the illumination unevenness is shaped like an isosceles triangle with the long edge 53 of the passport 9 as a base.

In the present embodiment, the light emitting elements (LEDs) are positioned such that the main illumination light from the light emitting elements (LED) is reflected by the mirror 11 and prevented from traveling to the page to be read 9. Specifically, the light emitting elements are arranged as far from the mirror 11 as possible. This enables a reduction in the adverse effect of the mirror 11 and thus the illumination unevenness.

In the present invention, the main illumination light has a sufficient intensity to meet the requirement for the ability to read images. For infrared light, the main illumination light has a sufficient intensity to allow automatic recognition to be carried out sufficiently accurately. For visible light, the main illumination light is bright enough to allow the user to read an image on a display. When a visible light image is automatically recognized, the main illumination light is bright enough to allow a recognition process to be carried out sufficiently accurately.

More specifically, the main illumination light is centered around the frontward direction of the light emitting elements and spans an angular range that meets the requirement for the reading ability. The angular range of the main illumination light may be the same as the above-described range of radiation angle of the light emitting elements.

In the present embodiment, the light emitting elements are positioned such that the main illumination light is prevented from traveling to the page to be read 9 after the reflection by the mirror 11. That is, the light emitting elements are arranged as far from the mirror 11 as possible in the perpendicular direction or closer to the page to be read 9. This allows the light emitting elements to be positioned such that the irradiation light reflected by the mirror 11 fails to reach the page to be read 9.

Moreover, as described above, when the mirror 11 is inclined, the range of the illumination unevenness increases with decreasing distance between the mirror 11 and the light emitting elements. Thus, the illumination unevenness forms an isosceles triangle with the long edge 53 of the passport 9 as a base. Hence, even at positions where the mirror 11 is located closer to the light emitting elements, the light emitting elements are preferably arranged so as not to be excessively close to the mirror 11.

As described above, the present embodiment enables a reduction in illumination unevenness and an increase in character recognition rate and the accuracy with which the image is checked but also facilitates visual recognition of the image acquired.

"Setting of Arrangement of the Light Sources with Reflection by the Mirror taken into Account (the Arrangement of the White LED 35f and the Infrared LED 25e)"

As already described, in the present embodiment, the white LED 35f and the infrared LED 25e are arranged closer to the page to be read 9 than the other LEDs. This arrangement is suitably set taking into account not only the above-described deformation of the passport 7 but also the adverse effect of reflection of the illumination light from the mirror 11. The arrangement of the white LED 35f will be described below but the following description also applies to the infrared LED 25e.

Here, the illumination unevenness occurring at the code 59, that is, a near-edge code is focused on. Since the mirror 11 is inclined, the code 59 is positioned close to the mirror 11. As already described, the range affected by the reflection by the mirror 11 increases with decreasing distance between the mirror 11 and the light emitting elements. According to the present embodiment, the white LED 35f, located close to the code 59, is arranged away from the mirror 11 (assuming that all the white LEDs 35a to 35f are arranged in a line, the light emitting element 35f, located close to the near-edge code, is arranged very close to the mirror 11, but the position of the white LED 35f is further from mirror 11 than this assumed position). This enables a reduction in the illumination unevenness occurring at the code 59 as a result of the adverse effect of the mirror 11.

Moreover, the present embodiment takes the following point into account. The illumination unevenness caused by the mirror 11 is such that the brightness on the page to be read 9 increases consistently with the distance from the light emitting elements. Thus, a place close to the light emitting elements is relatively dark. In contrast, according to the present embodiment, the white LED 35f is arranged close to the page to be read 9. Hence, the place close to the white LED 35f can be made brighter, enabling a reduction in illumination unevenness.

As described above, the arrangement of the white LED 35f according to the present embodiment exerts two effects. One of the two effects is a reduction in the range of the illumination unevenness occurring in the code 59 portion as a result of the arrangement of the white LED 35f away from the mirror 11. The other effect is the possibility of intensely illuminating the place close to the white LED 35f (the place made darker by the illumination unevenness) as a result of the arrangement of the white LED 35f closer to the page to be read 9. These effects work synergistically, and the present embodiment thus suitably exerts effects such as improvement of the reading ability.

A modification of the present embodiment will be described. The above-described code 59 is an example of the near-edge code according to the present invention. In the present invention, the near-edge code is positioned close to the edge of the object to be read. More specifically, the near-edge code is positioned close to the light source-side edge to allow the image for display to be obtained. At least a part of the code is positioned close to the light source-side edge. If the object to be read is a passport, the near-edge code is positioned close to the end of the edge (corner). Thus, the second light emitting element, lying at the furthest end, is located closer to the surface to be read (the second light emitting element emits the illumination light for display). However, the position of the near-edge code and the like vary depending on the type of the object to be read. The arrangement of the light sources may be correspondingly varied.

For example, the near-edge code may be positioned in the center of the light source-side edge. In this case, the second light emitting element corresponding to the center of the light source-side edge is arranged closer to the object to be read in accordance with the position of the near-edge code.

Furthermore, a plurality of light emitting elements may be arranged closer to the object to be read for one near-edge code. In other words, at least one light emitting element is arranged closer to the object to be read without departing from the scope of the present invention. The number of light emitting elements to be arranged closer to the surface to be read is suitably determined depending on the interval between the elements and the width of the code.

Additionally, the near-edge code need not be limited to a single position. A plurality of near-edge codes may be provided. In this case, a plurality of light emitting elements may be arranged at a plurality of positions each of which is closer to the object to be read.

In addition, the plurality of near-edge codes may have different purposes, meanings, applications, levels of importance, and the like. Thus, the arrangement of the light emitting element corresponding to the required near-edge code may be exclusively changed.

As described above, various modifications may be made without departing from the scope of the present embodiment. However, the passport 7 is often put in the owner's pocket during flight and is likely to undergo wave-like deformation. Moreover, the passport 7 contains the code 59 reaching the corner of the page to be read 9. Significant deformation and thus washed-out highlight are likely to occur in the corner. Therefore, the present embodiment is significantly advantageous to the passport 7.

The reader device 1 according to the embodiment of the present invention has been described. In the present embodiment, the first light source is the infrared light source 21. The first illumination light is infrared light. The first wavelength band and the first radiation angle are the wavelength band and radiation angle of infrared light from the infrared light source 21, respectively. Moreover, the first light emitting element array and the first light emitting elements are the infrared LED array 23 and the infrared LEDs 25a to 25e, respectively. Furthermore, the second light source is the white light source 31, serving as an example of a visible light source. The second illumination light is the white light. The second wavelength band and the second radiation angle are the wavelength band and radiation angle of white light from the white light source 31 are respectively. Moreover, the second light emitting element array and the second light emitting elements are the white LED array 33 and the white LEDs 35a to 35f, respectively. Additionally, in the present embodiment, the object to be read is the passport 7, the surface to be read is the page to be read 9, and the object placing unit is the mounting surface 5.

According to the present embodiment, in a place where the code is present close to the edge of the surface to be read, the light source is locally arranged closer to the object to be read. Thus, even if the edge of the surface to be read is subjected to wave-like deformation as a result of wetting of the object to be read or the like, a part of the code located close the edge can be prevented from being imaged under the specular reflection condition. Therefore, illumination can be properly provided so as to prevent the part of the code located at the edge from being difficult to see as a result of washed-out highlight.

Furthermore, according to the present embodiment, the light emitting element array is positioned such that the main light from the light emitting elements is prevented from traveling to the surface to be read after the reflection by the mirror. Thus, the present embodiment can eliminate the illumination unevenness resulting from the reflection by the mirror to obtain the good image. Therefore, the present embodiment can improve the character recognition rate and the accuracy with which the image is checked. The present embodiment also facilitates visual recognition of the image acquired.

Furthermore, according to the present embodiment, the near-edge code is provided at the end of the edge of the surface to be read. The light emitting element located at the near-edge code position is positioned at the end of the light emitting element array. In this configuration, the code is positioned at the end of the edge of the surface to be read, that is, in the corner of the surface to be read. The corner is more seriously affected by deformation. However, in the present invention, the light source is locally located closer to the surface to be read, thus properly preventing possible washed-out highlight in the corner.

Furthermore, according to the present embodiment, the reader device includes the mirror for redirecting the optical path between the surface to be read and the imaging unit. The mirror is inclined to the surface to be read. The light emitting element located at the near-edge code position is positioned at one of opposite ends of the light emitting element array which is closer to the mirror. This configuration enables a reduction in the illumination unevenness occurring at the near-edge code, and thus suitably exerts effects such as improvement of the reading ability.

Second Embodiment

If the object to be read is a passport or the like, then in many cases, the surface of the object to be read is covered with a transparent laminate film. Moreover, an optical diffraction pattern may be provided on the front and back surfaces of the laminate film or inside the laminate film in order to detect a fraud. Furthermore, in a document such as a passport, the edge is likely to be curled or floats. Thus, the document is likely to float from the reader device. When such an object to be read is illuminated, infrared light, which has a narrow wavelength band, is unlikely to be affected, whereas visible light, which has a wide wavelength band, may be affected. Specifically, if the visible light source is provided close to the surface to be read, an unintended pattern such as a rainbow color may appear in the picked-up image under the effect of the laminate and the diffraction pattern thereof. This may preclude the good image from being obtained and make the image displayed on the monitor difficult to view.

To avoid the above-described problem, conventional copiers and the like include a cover for holding the object to be read. However, when the object to be read is a passport or the like, a reading operation needs to be performed quickly. Thus, desirably, illumination can be properly provided without the use of a cover or the like, even if the object to be read slightly floats.

An object to be read such as a passport may wet with the owner's sweat, for example, while left in the owner's pocket. The wetting and the subsequent drying or the like subjects the edge of the object to be read to wave-like deformation (corrugation). When such wave-like deformation occurs, imaging of the edge may be carried out under the specular reflection condition, resulting in washed-out highlight. If a code such as characters is present at the edge, the code may fail to appear clearly in the image. Thus, desirably, illumination is properly provided so as to suitably prevent the wave-like deformation of the edge to allow an image of the edge to be picked up.

For example, passports are covered with a laminate or the like. Hence, washed-out highlight is likely to occur in an image of the passport under the specular reflection condition. Furthermore, in many of the passports, a code is printed so as to end in a corner of the corresponding page. The above-described wave-like deformation of the page is likely to be significant in the corner of the page. Thus, when an image of a passport subjected to wave-like deformation is picked up under illumination with visible light, a part of the code located in the corner may be difficult to see as a result of washed-out highlight. In particular, one or two characters in the corner are difficult to see. Thus, desirably, illumination is properly provided so as to prevent possible washed-out highlight in the part of the code located at the edge.

The background art of the present embodiment has been described using the infrared light source and the visible light source. However, the above-described problems are not limited to the infrared light source and the visible light source; similar problems may occur if plural types of light sources with different wavelength bands or radiation angles are used.

To solve such problems, the present embodiment provides a reader device which can properly illuminate the object to be read even when plural types of light sources with different wavelength bands or radiation angles are used and which provides the good image even if the object to be read floats as a result of deformation of the corresponding page.

The reader device according to the present embodiment includes an object placing unit on which an object to be read with a surface to be read is placed, a first light source for irradiating a surface to be read with first illumination light in a first wavelength band and a first radiation angle in order to acquire a first image used for reading processing, a second light source for irradiating the surface to be read with second illumination light in a second wavelength band wider than the first wavelength band and a second radiation angle wider than the first radiation angle in order to acquire a second image used for an application including display, and an imaging unit for picking up an image of the surface to be read illuminated by the first light source and the second light source. The first light source and the second light source are arranged outside the front area of the surface to be read. The second light source is located further from the surface to be read than the first light source in the perpendicular direction.

In this configuration, the reader device includes the first light source for the reading process and the second light source for display. The first light source is, for example, an infrared light source. The second light source is, for example, a visible light source. According to the present embodiment, the first light source is arranged closer to the surface to be read. Thus, even the first light source with the narrower radiation angle can irradiate the required area on the surface to be read with light, ensuring the reading ability. Furthermore, the second light source is arranged further from the surface to be read than the first light source. This reduces the difference in the distance to the second light source which is dependent on the location of the surface to be read. As a result, illumination unevenness is reduced, and the good image for display is obtained. Moreover, for example, it is assumed that the object to be read is covered with a laminate with an optical diffraction structure and that the object to be read floats from the mounting surface. Even in this case, since the second light source is arranged relatively far from the surface to be read, the image for display can be prevented from containing an unintended pattern and the displayed image can be prevented from being difficult to view. Thus, a reader device can be provided which can properly illuminate the object to be read even when plural types of light sources with different wavelength bands or radiation angles are used and which provides the good image even if the object to be read floats. Here, the wavelength band refers to the band of wavelength of light. Monochromatic light has a narrow wavelength band. White light has a wide wavelength band.

Furthermore, the reader device according to the present embodiment may be configured as follows. The surface to be read includes a near-edge code positioned close to an edge thereof. The second light source includes a second light emitting element array including a plurality of second light emitting elements. The second light emitting element included in the second light emitting element array and located at a near-edge code position corresponding to the near-edge code is arranged closer to the surface to be read in the perpendicular direction than the other second light emitting elements in the second light emitting element array.

In this configuration, in a place where the code is present close to the edge of the surface to be read, the second light source is locally arranged closer to the object to be read. Thus, even if the edge of the surface to be read is subjected to wave-like deformation as a result of wetting of the object to be read or the like, a part of the code located close the edge can be prevented from being imaged under the specular reflection condition. Therefore, illumination can be properly provided so as to prevent the part of the code located at the edge from being difficult to see as a result of washed-out highlight.

Furthermore, in the reader device according to the present embodiment, the first light source includes a first light emitting element array including a plurality of first light emitting elements. The second light emitting element located at the near-edge code position may be arranged adjacent to the plurality of first light emitting elements.

In this configuration, the second light source can be suitably locally arranged closer to the surface to be read. Thus, an image can be acquired in which possible washed-out highlight at the edge is prevented to allow the code to appear properly.

The reader device according to the present embodiment may be configured as follows. The near-edge code is provided at an end of the edge of the surface to be read. The second light emitting element located at the near-edge code position is positioned at the end of the second light emitting element array.

In this configuration, the code is positioned at the end of the edge of the surface to be read, that is, in the corner of the surface to be read. The corner is more seriously affected by deformation. However, according to the present invention, the second light source is locally located closer to the surface to be read, thus properly preventing possible washed-out highlight in the corner.

Furthermore, in the reader device according to the present embodiment, the first light source may be an infrared light source, and the second light source may be a visible light source. In this configuration, the infrared light source is used to obtain an image for reading processing. The visible light source is used to obtain an image for display. The visible light source provides a wider wavelength band and a wider radiation angle than the infrared light source. Even with such plural types of light sources, the object to be read can be properly illuminated. Additionally, the good image is obtained even if the object to be read floats.

Furthermore, in the reader device according to the present embodiment, the object to be read may be a passport. In this configuration, even if the object to be read is a passport covered with a laminate or the like, illumination with the first illumination light and the second illumination light can be properly achieved. The good image is obtained even if the object to be read floats.

The reader device according to the embodiment will be described with reference to the drawings.

In the present embodiment, the object to be read is a document or a card. In particular, an example of the document is a passport, and an example of the card is a boarding card for an airplane. Furthermore, a first light source is an infrared light source. A second light source is a visible light source, particularly a white light source.

Figure 8:
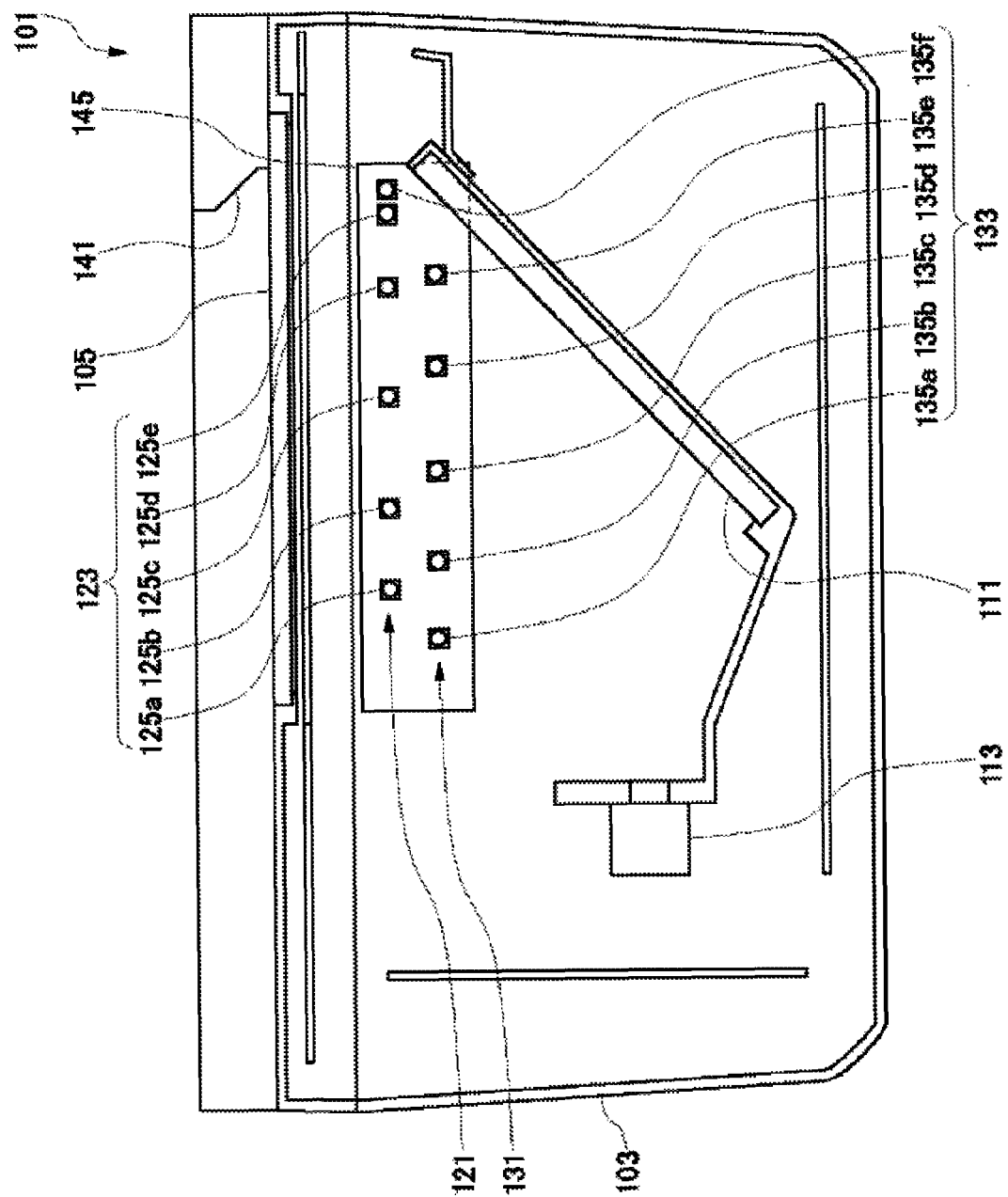
FIG. 8 is a cross-unital view of a reader device according to a second embodiment of the present invention.
Figure 9:
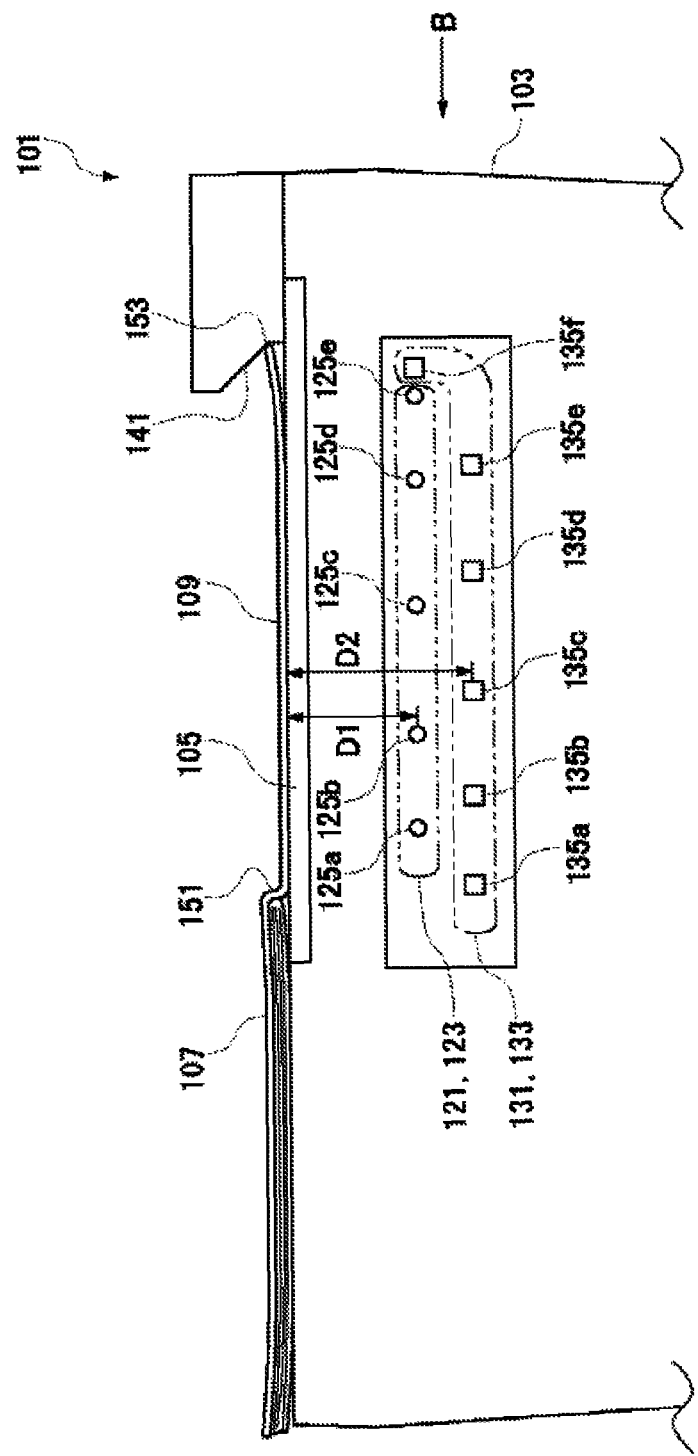
FIG. 9 is a cross-unital view of the reader device according to the second embodiment of the present invention, showing the arrangement of light sources.
Figure 10:
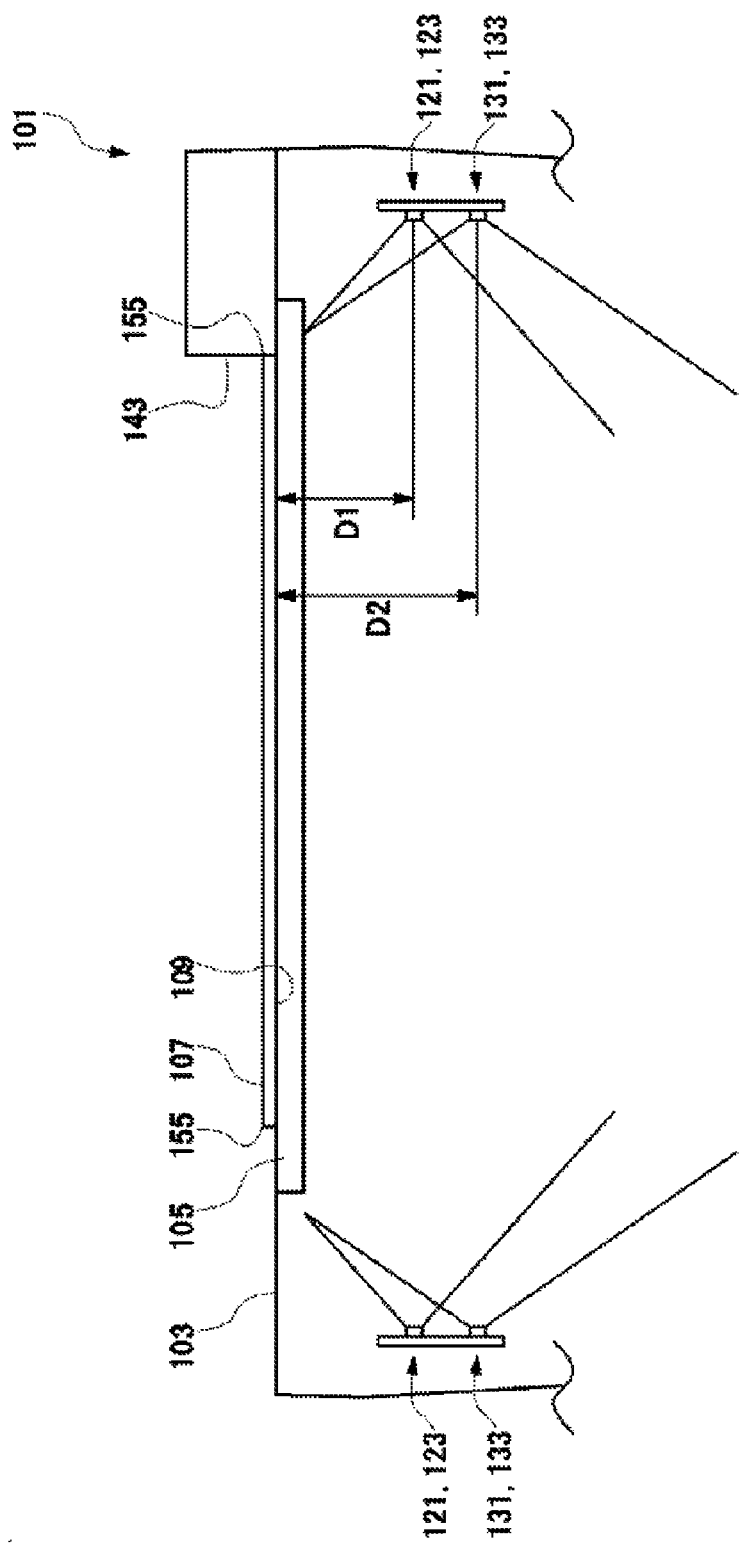
FIG. 10 is a cross-unital view of the reader device according to the second embodiment of the present invention, showing the arrangement of the light sources.
Figure 11:
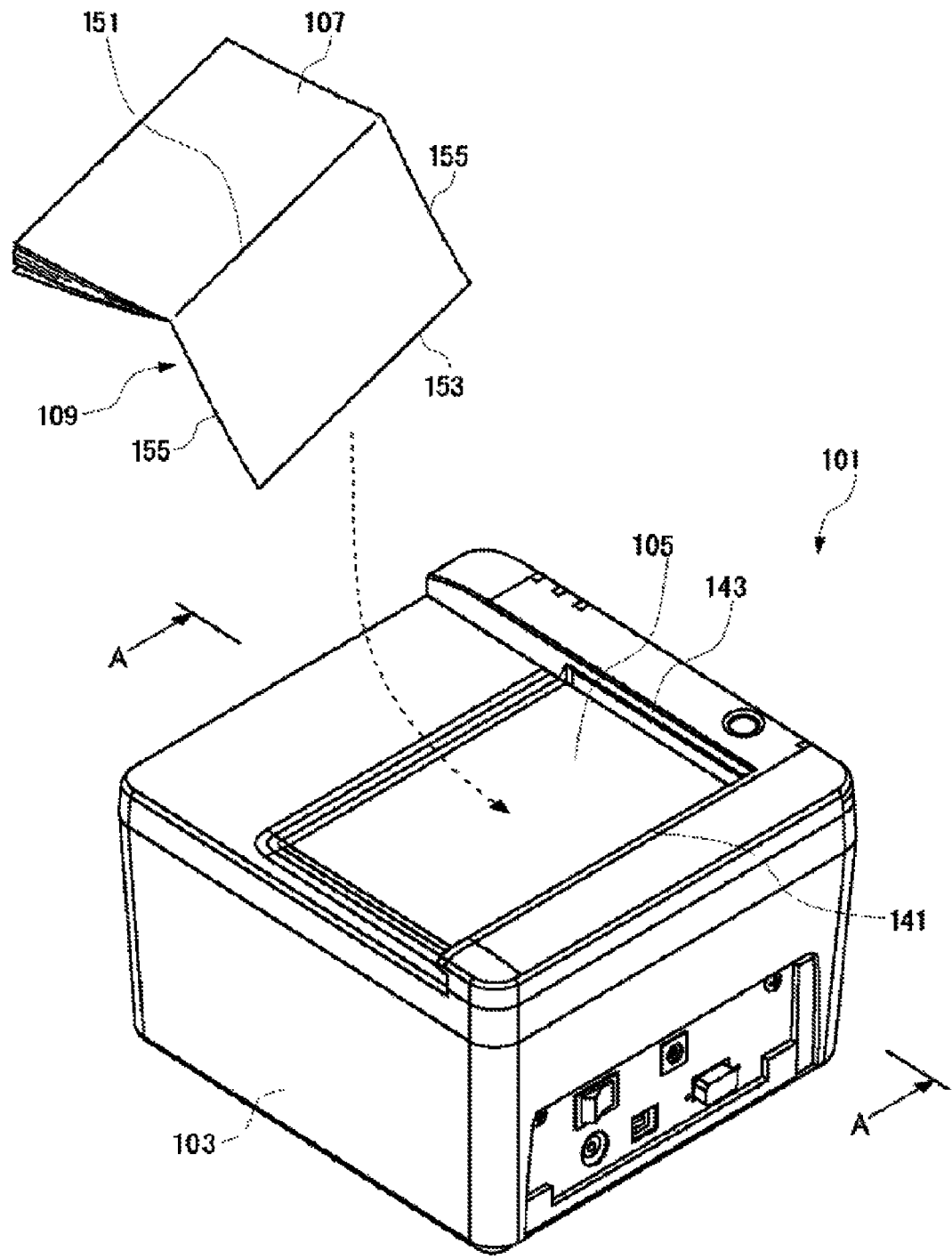
FIG. 11 is a perspective view of the reader device according to the second embodiment of the present invention.

The reading device according to the present embodiment is shown in FIG. 8 to FIG. 11. FIG. 8 to FIG. 10 are cross-unital views, and FIG. 11 is a perspective view.

First, as shown in FIG. 11, a reader device 101 includes a substantially cubic housing 103 with a mounting surface 105 provided on the top thereof. The mounting surface 105 is a transparent glass plate. The mounting surface 105 is where a passport 107 that is an object to be read is placed for reading and corresponds to an object placing unit according to the present invention. Furthermore, the housing 103 includes stop units 141 and 143 that are perpendicular to each other. The stop units 141 and 143 include stop walls. Two perpendicular sides of the passport 107 are brought into abutting contact with the stop units 141 and 143 to position the passport 107 on the mounting surface 105.

Figure 12:
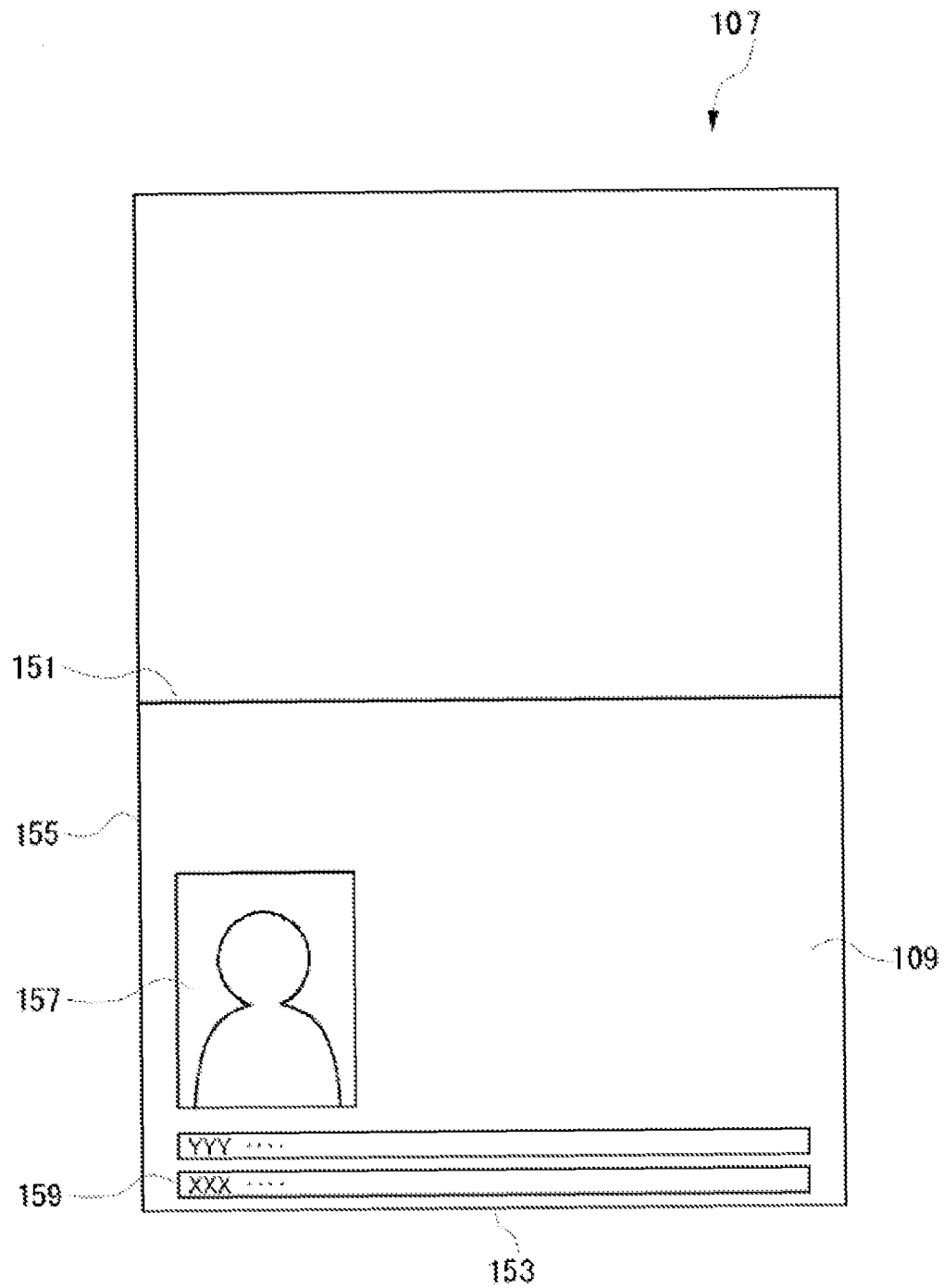
FIG. 12 is a diagram showing a page to be read of a passport that is an object to be read.

FIG. 12 schematically shows the passport 107. The passport 107 is a kind of document as described above and is formed of a plurality of sheets bound up at the center thereof. The passport 107 includes a page to be read 109 with a long edge 153 parallel to a binding edge 151 and a short edge 155 perpendicular to the binding edge 151. The long edge 153 and the short edge 155 correspond to a long side and a short side, respectively, of the page to be read 109, which is rectangular. The page to be read 109 contains a photograph 157 and a code 159. The code 159 is a string of characters or the like to be read by the reader device 101. In the passport 107, the code 159 is provided along the long edge 153. The passport 107 is placed on the mounting surface 105 so that the page to be read 109 faces downward.

FIG. 8 is a cross-unital view showing the reader device 101 cut along line A-A in FIG. 11. FIG. 9 is a diagram showing the arrangement of the light sources as viewed from the same direction as that in FIG. 8. FIG. 10 is a diagram showing the arrangement of the light sources as viewed from the direction of an arrow B in FIG. 9.

As shown in FIG. 8, a mirror 111 is provided under the mounting surface 105. A camera 113 is provided beside the mirror 111. The camera 113 corresponds to an imaging unit according to the present invention. The camera 113 utilizes reflection by the mirror 111 to pick up an image of the passport 107 from below. The camera 113 may pick up both an infrared light image and a visible light image. Alternatively, the infrared light image and the visible light image may be picked up by separate cameras. In this case, the imaging unit includes a plurality of cameras.

Furthermore, as shown in FIG. 8 to FIG. 10, the reader device 101 includes an infrared light source 121 and a white light source 131 both provided in a housing 103. The infrared light source 121 is formed of an infrared LED array 123 including a plurality of infrared LEDs 125a to 125e. Additionally, the white light source 131 is formed of a white LED array 133 including a plurality of white LEDs 135a to 135f. The infrared LEDs 125a to 125e and the white LEDs 135a to 135f are attached to a circuit board 145.

As shown in FIG. 9, the infrared light source 121 (infrared LED array 123) and the white light source 131 (white LED array 133) are arranged outside a front area of the page to be read 109 and outside both short edges 155.

Furthermore, as shown in FIG. 8 to FIG. 10, the infrared light source 121 (infrared LED array 123) and the white light source 131 (white LED array 133) are generally arranged away from the page to be read 109 in the perpendicular direction. Here, the perpendicular direction is perpendicular to the page to be read 109 placed on the mounting surface 105, that is, perpendicular to the mounting surface 105. In the present embodiment, a second distance D2 from the page to be read 109 to the white light source 131 in the perpendicular direction is longer than a first distance D1 from the page to be read 109 to the infrared light source 121 in the perpendicular direction (FIG. 10).

However, the white LED 135*f*, included in the white LED array 133 and located at an end of the array 33 which is furthest from the binding edge 151, is exceptionally arranged closer to the page to be read 109 than the other white LEDs 135*a* to 135*e* in the perpendicular direction. Specifically, the white LED 135*f*, located at the furthest end, is arranged adjacent to the infrared LED 125*e*, located at the furthest end of the infrared LED array 123.

Now, the operation of the reader device 101 according to the present embodiment will be described. First, the user mounts the passport 107 on the mounting surface 105 so that the page to be read 109 faces downward. The long edge 153 and short edge 155 of the passport 107 are brought into abutting contact with the stop units 141 and 143 to position the passport 107. Then, an image of the page to be read 109 is picked up in response to the user's operation.

When the device carries out reading processing, the infrared light source 121 illuminates the page to be read 109 with infrared light, and the camera 113 generates an infrared light image. The infrared light image is used for the reading process and corresponds to the first image according to the embodiment. Then, reading processing unit (not shown in the drawings) processes the infrared light image to recognize the code such as characters. In the infrared light image, a background image is prevented from showing up clearly, whereas the code such as characters to be recognized is in a sharp contrast with the background image. Thus, the reading process can be accurately carried out. The reading processing unit may be formed of a computer. Alternatively, the reading processing unit may be provided outside the reader device 101.

Furthermore, when an image for display is to be acquired, the white light source 131 irradiates the page to be read 109 with white light, and the camera 113 generates a visible light image. The visible light image is output to a monitor (not shown in the drawings), on which the visible light image is displayed. The visible light image corresponds to the second image according to the present embodiment.

Now, the arrangement of the infrared light source 121 and the white light source 131 according to the present embodiment will be described in further detail.

First, setting of the first distance D1 from the page to be read 109 to the infrared light source 121 will be described. The infrared light source 121 allows the code 159 shown in FIG. 12 to be read. The code 159 is provided along the long edge 153 of the page to be read 109.

In contrast, the infrared LEDs 125*a* to 125*e* in the infrared light source 121 each have a narrow wavelength band and a narrow radiation angle. The radiation angle corresponds to a range within which the illumination light exhibits a brightness of a predetermined level or higher, as described above. The radiation angle is defined as, for example, the range within which when a frontward brightness is set to be a reference value, the illumination light exhibits a brightness accounting for at least a predetermined rate of the reference value. The first distance D1 is long because of the narrow radiation angle. If the infrared light source 121 is arranged away from the page to be read 109, an area located far from the infrared light source 121 can be irradiated with light, whereas an area located close to the infrared light source 121 cannot be irradiated with light. This degrades the reading ability. Thus, the first distance D1 is set to a value such that the entire code 159 including the area located close to the infrared light source 121 can be irradiated with light, ensuring the reading ability.

Now, the arrangement of the white light source 131 will be described. The arrangement of the white light source 131 is set taking (1) to (3) described below into account.

(1) First, the position and direction of the white light source 131 are set to avoid the specular reflection condition. As already described, the specular reflection condition refers to the coincidence of the direction of image pickup with the direction of specular reflection of illumination light. When an image of the page to be read 109 is picked up under the specular reflection condition, reflected light obtained is excessively intense, leading to what is called washed-out highlight. This prevents the good image from being obtained. In the present embodiment, the white light source 131 is arranged outside the front area of the page to be read 109 and illuminates the page to be read 109 from the side. This allows an incident angle to be set wider and serves to avoid the specular reflection condition and thus washed-out highlight.

(2) Furthermore, the brightness of white light varies significantly depending on the distance from the white light source 131. When the second distance D2 from the page to be read 109 to the white light source 131 is short, the distance to the white light source 131 varies depending on the position of the page to be read 109. This makes the illumination and thus the resultant image uneven. Specifically, a central portion of the page to be read 109 is located away from the white light sources 131, arranged on the opposite sides of the page to be read 109, and thus appears dark. Thus, the second distance D2 is set to a value at which the unevenness can be reduced to provide the required image quality. As a result, the second distance D2 is set longer than the first distance D1. Hence, the white light source 131 is positioned further from the page to be read 109 than infrared light source 121.

(3) Furthermore, in many cases, the page to be read 109 of the passport 107 is covered with a transparent laminate film. Moreover, in many cases, an optical diffraction pattern is provided on the front and back surfaces of the laminate film or inside the laminate film in order to detect a fraud. Furthermore, in a document such as the passport 107, the edge is likely to be curled or float. Thus, the passport 107 has the property of being likely to float from the reader device 101.

When such a passport 107 is illuminated, illumination with infrared light, which has a narrow wavelength band, is unlikely to be affected, whereas illumination with visible light, which has a wide wavelength band, may be affected. Specifically, if the white light source 131 is provided close to the page to be read 109, an unintended pattern such as a rainbow color may appear in the picked-up image under the effect of the laminate and the diffraction structure thereof. This may preclude the good image from being obtained and make the image displayed on the monitor difficult to view. Thus, in the present embodiment, the second distance D2 for the white light source 131 is set to a value at which an unintended pattern is unlikely to appear even if the corresponding page of the passport 107 floats from the mounting surface 105 as a result of deformation or the like. Consequently, the second distance D2 is set longer than the first distance D1. Hence, the white light source 131 is positioned further from the page to be read 109 than infrared light source 121.

To avoid floating of the page as described above, conventional copiers and the like include a cover for holding the object to be read. However, the reading of the passport 107 is carried out, for example, for an immigration check at an airport and thus needs to be quickly finished. Thus, if each passport 107 is set and held using the cover, the operation requires a long time. In contrast, as shown in FIG. 8, the reader device 101 according to the present embodiment need not include a presser cover and allows the passport 107 to be set on the mounting surface 105 in a short time.

Now, with reference to FIG. 13, the arrangement of the white LED 135f, located at the end of the white light source 131, will be described. The arrangement of the white LED 135f relates to the position of the code 159 in the page to be read 109. The code 159 is provided close to and along the long edge 153 of the page to be read 109, as described above. The end of the code 159 reaches the vicinity of the short edge 155 of the page to be read 109 and is positioned in the corner of the page to be read 109.

The white LED 135f is positioned at the further end of the white LED array 133. The position of the white LED 135f corresponds to the code 159 in the direction of the array. The white LED 135f is arranged higher than the other white LEDs 135a to 135e in the white LED array 133, that is, closer to the page to be read 109 in the perpendicular direction. Specifically, the white LED 135f is located at the same height as that of the infrared LED array 123. Such arrangement gives the following advantages.

The passport 107 may be held in an owner's pocket for a long time and wet with the owner's sweat. The wetting and the subsequent drying or the like or putting and taking the passport 107 into and out of the pocket subjects the edges of the passport 107 to wave-like deformation (corrugation), with the end of each edge subjected to curled deformation. In the pocket, the short edge 155 is positioned at the bottom portion of the pocket. Thus, the short edge 155 is likely to undergo such deformation.

When the wave-like deformation occurs, the angle between the page to be read 109 and the white light source 131 increases and decreases periodically along the short edge 155. In a place where the angle between the page to be read 109 and the white light source 131 is wider, the incident angle (=output angle) is narrower, thus allowing the specular reflection condition to be locally established. Consequently, when the wave-like deformation occurs, the specular reflection condition is periodically established along the short edge 155. As a result, as shown in the left half of FIG. 13, a plurality of small washed-out areas are created at intervals along the short edge 155. Depending on the shape of the corrugation, any of the washed-out areas overlaps the code 159, the end of which lies in the washed-out area, as shown in FIG. 13. Thus, in an image generated using the white light source 131, the end of the code 159 is difficult to see. In particular, about one or two characters located at the end of the code 159 are difficult to see.

The code 159 is a target for automatic reading using the infrared light source 121. However, even in a visible light image picked up using the white light source 131, the entire code 159 needs to be displayed, for example, to allow the result of reading to be checked. Thus, such a washed-out highlight phenomenon as described above needs to be prevented.

To accomplish this object, the present embodiment is configured such that the white LED 135f, positioned so as to correspond to the code 159, is locally arranged close to the page to be read 109. Thus, the incident angle (=output angle) of white light is wider at the position of the code 159 than in the other places. Hence, even with a change in the angle of the corner of the page to be read 109 resulting from deformation, the incident angle is prevented from decreasing excessively. The specular reflection condition can thus be avoided. This serves to prevent possible washed-out highlight at the position corresponding to the code 159 as shown in the right half of FIG. 13.

When the white LED 135f is arranged close to the page to be read 109, the irradiation range of the white LED 135f is narrowed. This may cause illuminance unevenness. However, in the present embodiment, only the white LED 135f is locally arranged at the different position. The other white LEDs 135a to 135e irradiate the entire page to be read 9 with light over a wide radiation angle. Hence, possible illuminance unevenness is not significant enough to affect the check of the image.

Figure 13:
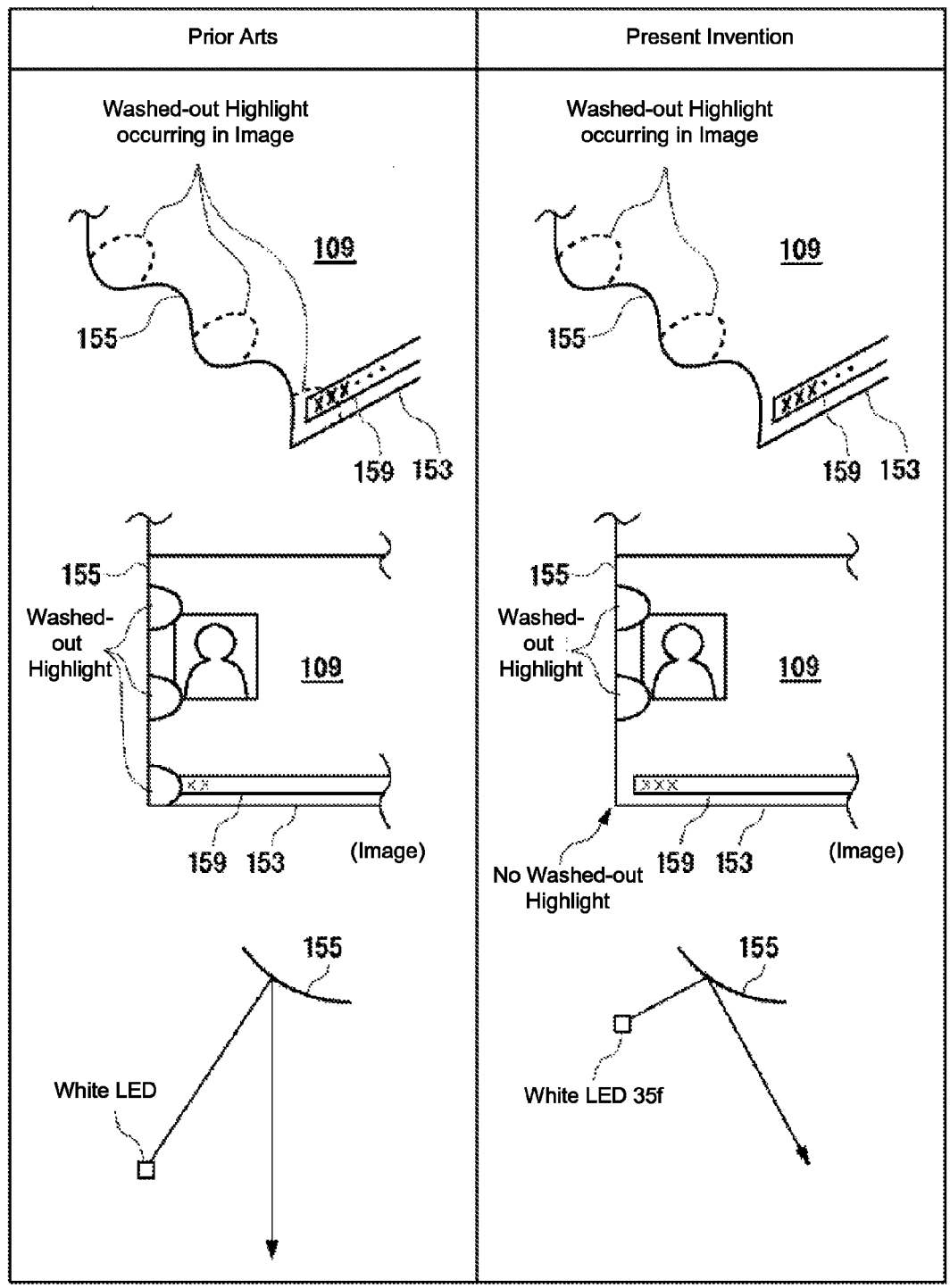
FIG. 13 is a diagram illustrating the principle of the present invention for prevention of possible washed-out highlight at the position of a code when a passport is subjected to wave-like deformation.

Furthermore, as shown in FIG. 13, washed-out areas remain in a place where the code 159 is not provided. However, in the areas other than the one in which the code 59 is written, information with a high level of importance (for example, a photograph of the owner's face) is located close to the center of the page so as to avoid the contamination or deformation of the page. Thus, the present embodiment acquires a good image of the area of the code 159, which is likely to be deformed, while somewhat permitting the occurrence of washed-out highlight in areas in which information with a high level of importance is unlikely to be written.

Now, a modification of the present embodiment will be described. The above-described code 159 is an example of the near-edge code according to the present invention. In the present invention, the near-edge code is positioned close to the edge of the object to be read. More specifically, the near-edge code is positioned close to the light source-side edge to allow the image for display to be obtained. At least a part of the code is positioned close to the light source-side edge. If the object to be read is a passport, the near-edge code is positioned close to the end of the edge. Thus, the second light emitting element, lying at the furthest end, is located closer to the surface to be read (the second light emitting element emits the illumination light for display). However, the position of the near-edge code and the like vary depending on the type of the object to be read. The arrangement of the light sources may be correspondingly varied.

For example, the near-edge code may be positioned in the center of the light source-side edge. In this case, the second light emitting element corresponding to the center of the edge is arranged closer to the object to be read in accordance with the position of the near-edge code.

Furthermore, a plurality of second light emitting elements may be arranged closer to the object to be read for one near-edge code. In other words, at least one second light emitting element is arranged closer to the object to be read without departing from the scope of the present invention. The number of second light emitting elements to be arranged closer to the surface to be read is suitably determined depending on the interval between the elements and the width of the code.

Additionally, the near-edge code need not be limited to a single position. A plurality of near-edge codes may be provided. In this case, a plurality of second light emitting elements may be arranged at a plurality of positions each of which is closer to the object to be read.

In addition, the plurality of near-edge codes may have different purposes, meanings, applications, levels of importance, and the like. Thus, the arrangement of the second light emitting element corresponding to the required near-edge code may be exclusively changed.

As described above, various modifications may be made without departing from the scope of the present embodiment. However, the passport 107 is often put in the owner's pocket during flight and is likely to undergo wave-like deformation. Moreover, the passport 107 contains the code 159 reaching the corner of the page to be read 109. Significant deformation and thus washed-out highlight are likely to occur in the corner. Therefore, the present embodiment is significantly advantageous to the passport 107.

The reader device 101 according to the present embodiment has been described. In the present embodiment, the first light source is the infrared light source 121. The first illumination light is infrared light. The first wavelength band and the first radiation angle are the wavelength band and radiation angle of infrared light from the infrared light source 121, respectively. Moreover, the first light emitting element array and the first light emitting elements are the infrared LED array 123 and the infrared LEDs 125a to 125e, respectively. Furthermore, the second light source is the white light source 131, serving as an example of a visible light source. The second illumination light is the white light source. The second wavelength band and the second radiation angle are the wavelength band and radiation angle of white light from the white light source 131 are respectively. Moreover, the second light emitting element array and the second light emitting elements are the white LED array 133 and the white LEDs 135a to 135f, respectively. Additionally, in the present embodiment, the object to be read is the passport 107, the surface to be read is the page to be read 109, and the object placing unit is the mounting surface 105.

According to the present embodiment, the reader device 101 includes the infrared light source 121 and the white light source 131. The white light source 131 has a wider wavelength band and a wider radiation angle than the infrared light source 121. In the present embodiment, the infrared light source 121 and the white light source 131 are arranged outside the front area of the surface to be read. The white light source 131 is arranged further from the surface to be read than the infrared light source 121 in the perpendicular direction. The infrared light source 121 is arranged closer to the surface to be read. Thus, even the infrared light source 121 with a narrow radiation angle can irradiate the required area on the surface to be read with light, ensuring the reading ability. Furthermore, the white light source 131 is arranged further from the surface to be read than the infrared light source 121. This reduces the difference in the distance to the infrared light source 121 which is dependent on the location of the surface to be read. As a result, illumination unevenness is reduced, and the good image for display is obtained. Moreover, for example, it is assumed that the object to be read is covered with a laminate with an optical diffraction structure and that the object to be read floats from the mounting surface. Even in this case, since the white light source 131 is arranged relatively far from the surface to be read, the image for display can be prevented from containing an unintended pattern and the image can be prevented from being difficult to view. Thus, a reader device can be provided which can properly illuminate the object to be read even when plural types of light sources with different wavelength bands or radiation angles are used and which provides the good image even if the object to be read floats.

Furthermore, according to the present embodiment, the surface to be read contains the near-edge code. The near-edge code is positioned closer to the second light source when the object to be read is placed on the object placing unit. In the above-described embodiment, the near-edge code is the code 159. The white light source 131 includes the white LED array 133 including the plurality of white LEDs 135a to 135f. The white LED 135f, included in the white LED array 133 and located at the near-edge code position corresponding to the near-edge code, is arranged closer to the surface to be read than the other white LEDs 135a to 135e in the perpendicular direction. Thus, in a place where the code 159 is present close to the edge of the surface to be read, the white light source 131 is locally arranged closer to the passport 107. Thus, even if the edge of the surface to be read is subjected to wave-like deformation as a result of wetting of the passport 107 or the like, a part of the code 159 located close the edge can be prevented from being imaged under the specular reflection condition. Therefore, illumination can be properly provided so as to prevent the part of the code 159 located at the edge from being difficult to see as a result of washed-out highlight.

Furthermore, according to the present embodiment, the infrared light source 121 includes the infrared LED array 123 including the plurality of infrared LEDs 125a to 125e. The white LED 135f, located at the near-edge code position, is arranged adjacent to the plurality of infrared LEDs 125a to 125e. In the above-described embodiment, the white LED 135f is arranged adjacent to the infrared LED 125e and outside the infrared LED array 123. The white LED 135f may be arranged between two adjacent infrared LEDs. In this configuration, the white light source 131 can be suitably locally arranged closer to the object to be read. Therefore, an image can be acquired in which possible washed-out highlight at the edge is prevented to allow the code 159 to appear properly.

Furthermore, according to the present embodiment, the code 159 (near-edge code) is provided at the end of the edge of the surface to be read, that is, in the corner of the surface to be read. The white LED 135f, located at the near-edge code position, is positioned at the end of the white LED array 133 so as to correspond to the position of the code 159. The corner is more seriously affected by deformation. However, according to the present invention, the white LED 135f is locally located closer to the surface to be read, thus properly preventing possible washed-out highlight in the corner.

Furthermore, according to the present embodiment, the first light source is the infrared light source 121, and the second light source is the white light source 131. In this configuration, the infrared light source 121 is used to obtain the image for the reading process. The white light source 131 is used to obtain the image for display. The white light source 131 provides a wider wavelength band and a wider radiation angle than the infrared light source 121. Even with such plural types of light sources, the object to be read can be properly illuminated. Additionally, the good image is obtained even if the object to be read floats.

Furthermore, in the reader device according to the present embodiment, the object to be read is the passport 107. In this configuration, even if the object to be read is the passport 107 covered with a laminate or the like, illumination with infrared light and white light can be properly achieved. The good image is obtained even if the object to be read floats.

The currently possible preferred embodiments have been described. However, it should be appreciated that various modifications may be made to the present embodiments. The accompanying claims are intended to embrace all such modifications falling within the spirit and scope of the present invention.

INDUSTRIAL APPLICABILITY

As described above, the reader device according to the present invention can provide the good image even if the page of the object to be read is deformed as describe above. The reader device is useful as a document reader device or the like, and particularly as a passport reader device or the like.

REFERENCE SIGNS LIST

1 Reader device
5 Mounting surface
7 Passport
9 page to be read
11 Mirror
13 Camera
21 Infrared light source
23 Infrared LED array
25a to 25e Infrared LEDs
31 White light source
33 White LED array
35a to 35f White LEDs
51 Binding edge
53 Long edge
55 Short edge
59 Code
101 Reader device
105 Mounting surface
107 Passport
109 Page to be read
111 Mirror
113 Camera
121 Infrared light source
122 Infrared LED array
125a to 125e Infrared LEDs
131 White light source
133 White LED array
135a to 135f White LEDs
151 Binding edge
153 Long edge
155 Short edge

The invention claimed is:

1. A reader device comprising:
an object placing unit (5) on which an object (7) to be read with a surface to be read (9) is placed;
a light source (21 or 31) which illuminates the surface to be read placed on the object placing unit and which includes a light emitting element array (23 or 33) comprising a plurality of light emitting elements (25a-25e or 35a-35e); and
an imaging unit (13) which picks up an image of the surface to be read illuminated by the light source,
wherein the light source is arranged outside a front area of the surface to be read, a light emitting element (25e or 35f) of the plurality of light emitting elements which is positioned at an end of the light emitting element array is arranged closer to the surface to be read than the other light emitting elements (25a-25d or 35a-35d) of the plurality of light emitting elements in a direction perpendicular to the object placing unit, and the other light emitting elements are arranged in a single line on a plane parallel to the object placing unit.

2. The reader device according to claim 1, wherein the light source includes:
a first light source which irradiates the surface to be read with first illumination light with a first wavelength band and a first radiation angle in order to acquire a first image used for reading processing, and
a second light source which irradiates the surface to be read with second illumination light with a second wavelength band wider than the first wavelength band and a second radiation angle wider than the first radiation angle in order to acquire a second image used for an application including display.

3. The reader device according to claim 2, wherein the first light source is an infrared light source, and the second light source is a visible light source.

4. The reader device according to claim 1, wherein the object to be read is a passport.

5. The reader device according to claim 1,
wherein the surface to be read of the object includes a near-edge code positioned close to an edge of the surface, and
the light emitting element which is positioned at the end of the light emitting element array is located at the near-edge code position.

6. The reader device according to claim 1, wherein the light source is a visible light source.

7. A reader device comprising:
an object placing unit (5) on which an object (7) to be read with a surface to be read (9) is placed, wherein the object placing unit has two sides (41, 43), one side (41) extending along the first direction and the other side (43) extending along the second direction which is perpendicular to the first direction;
a light source (21 or 31) which illuminates the surface to be read placed on the object placing unit and which includes a light emitting element array (23 or 33) comprising a plurality of light emitting elements (25a-25e or 35a-35e); and
an imaging unit (13) which picks up an image of the surface to be read illuminated by the light source;
wherein the light source is arranged outside a front area of the surface to be read, the plurality of light emitting elements are arranged in a single plane which is perpendicular to the first direction, and a light emitting element (25e or 35f) of the plurality of light emitting elements which is positioned at an end of the light emitting element array in the second direction is arranged closer to the surface to be read than the other light emitting elements (25a-25d or 35a-35d) of the plurality of light emitting elements in a direction perpendicular to the object placing unit.

8. The reader device according to claim 7, further comprising a mirror which redirects an optical path between the surface to be read and the imaging unit,
wherein the mirror inclines, in the second direction, toward an object mounting surface of the object placing unit.

9. The reader device according to claim 7, wherein the surface to be read of the object includes a near-edge code positioned close to an edge of the surface, and
the light emitting element which is positioned at the end of the light emitting element array is located at the near-edge code position.

10. The reader device according to claim 7, wherein the light source includes:
a first light source which irradiates the surface to be read with first illumination light with a first wavelength band and a first radiation angle in order to acquire a first image used for reading processing, and
a second light source which irradiates the surface to be read with second illumination light with a second wavelength band wider than the first wavelength band and a second radiation angle wider than the first radiation angle in order to acquire a second image used for an application including display.

11. The reader device according to claim 10, wherein the first light source is an infrared light source, and the second light source is a visible light source.

12. The reader device according to claim 7, wherein the object to be read is a passport.

13. The reader device according to claim 7, wherein the light source is a visible light source.

14. A reader device comprising:
- an object placing unit (5) on which an object (7) to be read with a surface to be read (9) is placed, wherein the object placing unit has two sides (41, 43), one side (41) extending along the first direction and the other side (43) extending along the second direction which is perpendicular to the first direction;
- a light source (21 or 31) which illuminates the surface to be read placed on the object placing unit and which includes a light emitting element array (23 or 33) comprising a plurality of light emitting elements (25a-25e or 35a-35e), wherein center lines of main illumination light from the light emitting elements are in parallel with the first direction; and
- an imaging unit (13) which picks up an image of the surface to be read illuminated by the light source;
- wherein the light source is arranged outside a front area of the surface to be read, a light emitting element (25e or 35f) of the plurality of light emitting elements which is positioned at an end of the light emitting element array in the second direction is arranged closer to the surface to be read than the other light emitting elements (25a-25d or 35a-35d) of the plurality of light emitting elements in a direction perpendicular to the object placing unit.

\* \* \* \* \*